(12) United States Patent
Komiya et al.

(10) Patent No.: US 11,070,143 B2
(45) Date of Patent: Jul. 20, 2021

(54) POWER CONVERSION DEVICE WITH SELECTIVE VOLTAGE CONTROL

(71) Applicant: KABUSHIKI KAISHA YASKAWA DENKI, Kitakyushu (JP)

(72) Inventors: Ryusuke Komiya, Fukuoka (JP); Shinichi Akimoto, Fukuoka (JP); Hiroyuki Imayoshi, Fukuoka (JP); Mitsunori Sato, Fukuoka (JP); Toshihiro Hanada, Fukuoka (JP)

( * ) Notice: Subject to any disclaimer, the term of this patent is extended or adjusted under 35 U.S.C. 154(b) by 0 days.

(21) Appl. No.: 16/528,495

(22) Filed: Jul. 31, 2019

(65) Prior Publication Data

US 2020/0044579 A1 Feb. 6, 2020

(30) Foreign Application Priority Data

Aug. 1, 2018 (JP) .............................. JP2018-145103
Jul. 17, 2019 (JP) .............................. JP2019-132189

(51) Int. Cl.
*H02M 7/48* (2007.01)
*H02M 7/5395* (2006.01)
(Continued)

(52) U.S. Cl.
CPC .............. *H02M 7/48* (2013.01); *H02M 7/483* (2013.01); *H02M 7/487* (2013.01); *H02M 7/5395* (2013.01); *H02M 2007/53876* (2013.01)

(58) Field of Classification Search
CPC .......... H02M 7/42; H02M 7/48; H02M 7/483; H02M 7/487; H02M 7/5387;
(Continued)

(56) References Cited

U.S. PATENT DOCUMENTS 9,362,840 B2 * 6/2016 Kato ..................... H02M 7/487
2011/0134672 A1 6/2011 Sato et al.
(Continued)

FOREIGN PATENT DOCUMENTS

CN 102132480 7/2011
CN 103081333 5/2013
(Continued)

OTHER PUBLICATIONS

Office Action issued in Japanese patent Application No. P2018-145103, dated Jul. 16, 2019 (with English partial translation).
(Continued)

*Primary Examiner* — Thienvu V Tran
*Assistant Examiner* — Shahzeb K Ahmad
(74) *Attorney, Agent, or Firm* — Soei Patent & Law Firm

(57) ABSTRACT

A power conversion device includes a power conversion circuitry configured to convert DC power into AC power by switching on/off a plurality of switching elements to switch each of a plurality of phase voltages to a voltage level selected from one of three levels including a first voltage, a second voltage higher than the first voltage, and a third voltage higher than the second voltage. A control circuitry is configured to control the plurality of switching elements so as to convert DC power into AC power without producing a combination of the first voltage and the third voltage between any two phases of the plurality of phase voltages.

20 Claims, 14 Drawing Sheets

(51) Int. Cl.
*H02M 7/487* (2007.01)
*H02M 7/483* (2007.01)
*H02M 7/5387* (2007.01)

(58) Field of Classification Search
CPC ......... H02M 2007/53876; H02M 1/08; H02M 1/084; H02M 1/38
See application file for complete search history.

(56) References Cited

U.S. PATENT DOCUMENTS

2017/0302200 A1* 10/2017 Marcinkiewicz ....... H02M 1/44
2018/0006547 A1* 1/2018 Mori ....................... H02P 25/03
2019/0157969 A1* 5/2019 Nishibata ................ H02M 1/32

FOREIGN PATENT DOCUMENTS

| | | |
|---|---|---|
| EP | 2611021 | 7/2013 |
| JP | H6-178546 | 6/1994 |
| JP | 09182452 A * | 7/1997 |
| JP | H9-182452 | 7/1997 |
| JP | H9-191657 | 7/1997 |
| JP | 2002-204579 | 7/2002 |
| JP | 2017-093039 | 5/2017 |

OTHER PUBLICATIONS

Office Action issued in Chinese Patent Application No. 201910700715.0, dated Apr. 13, 2021 (with English partial translation).

\* cited by examiner

POWER CONVERSION DEVICE WITH SELECTIVE VOLTAGE CONTROL

CROSS-REFERENCE TO RELATED APPLICATION

This application is based upon and claims the benefit of priority from Japanese Patent Application No. 2018-145103, filed on Aug. 1, 2018, and Japanese Patent Application No. 2019-132189, filed on Jul. 17, 2019, the entire contents of which are incorporated herein by reference.

BACKGROUND

Field

The present disclosure relates to a power conversion device and a control method.

Description of the Related Art

Japanese Unexamined Patent Publication No. 2002-204579 discloses a three-level inverter that outputs three voltage levels including positive-side potential, negative-side potential, and zero potential per phase.

SUMMARY

An example power conversion device disclosed herein includes a power conversion circuitry configured to convert direct current power into alternating current power by switching on/off a plurality of semiconductor switching elements to switch each of a plurality of phase voltages to a voltage level in three levels. The three levels may include a first voltage, a second voltage higher than the first voltage, and a third voltage higher than the second voltage. Additionally, the power conversion device includes a control circuitry configured to control the semiconductor switching elements so as to convert the direct current power into the alternating current power without producing a combination of the first voltage and the third voltage between any two phases of the phase voltages.

An example control method for a power conversion circuitry is also disclosed herein. The power conversion circuitry is configured to convert direct current power into alternating current power by switching on/off a plurality of semiconductor switching elements to switch each of a plurality of phase voltages to a voltage level in three levels. The three levels may include a first voltage, a second voltage higher than the first voltage, and a third voltage higher than the second voltage. The control method includes: determining an on/off switching timing of the semiconductor switching elements so as to convert the direct current power into the alternating current power without producing a combination of the first voltage and the third voltage between any two phases of the phase voltages. Additionally, the control method includes controlling the power conversion circuitry so as to switch on/off the semiconductor switching elements at the determined timing.

DETAILED DESCRIPTION

In the following description, with reference to the drawings, the same elements or similar elements having the same functions are denoted by the same reference signs and an overlapping description is omitted.

Power Conversion Device

Figure 1:
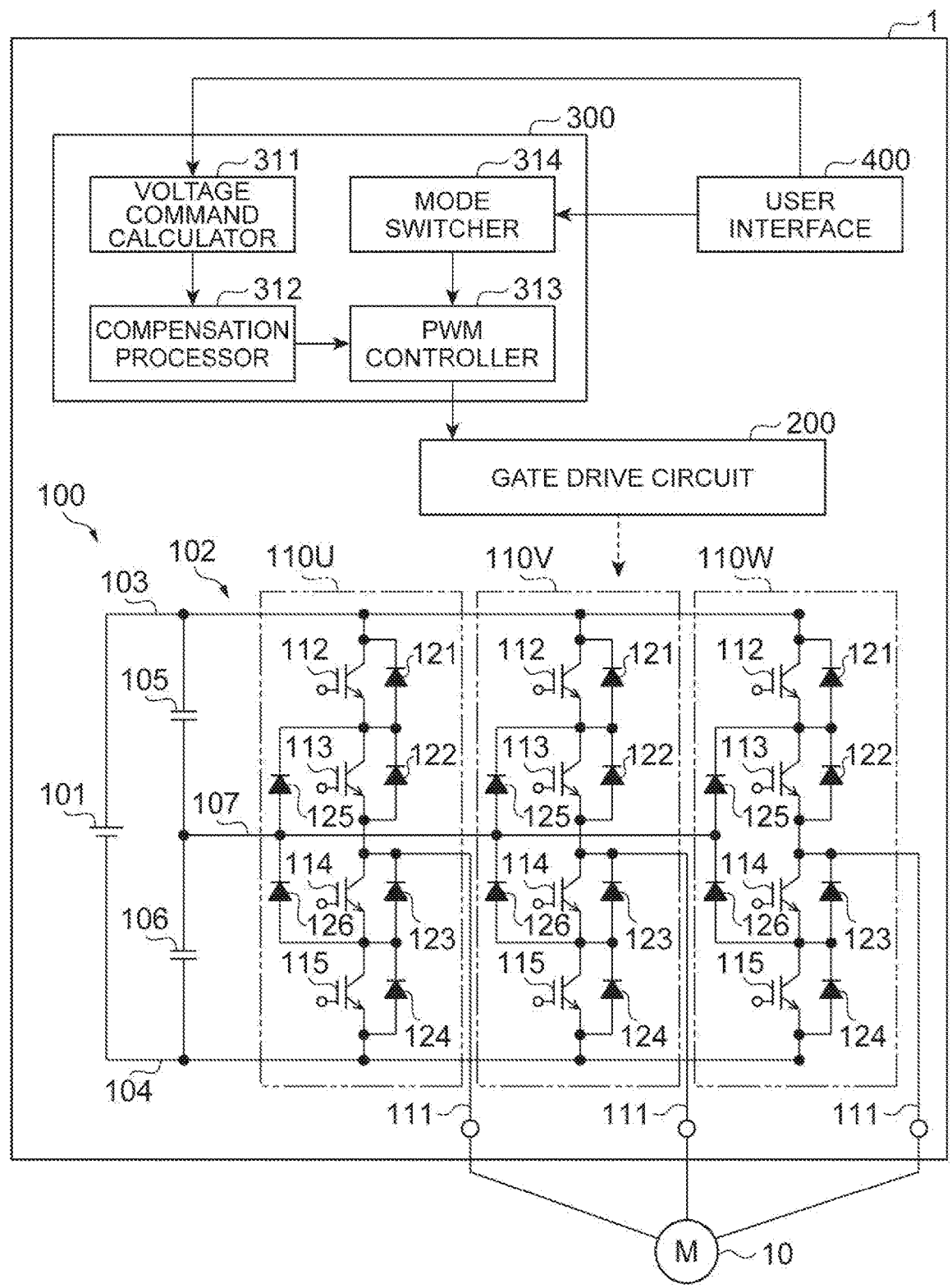
FIG. 1 is a diagram illustrating an example configuration of a power conversion device.

An example power conversion device 1 illustrated in FIG. 1 is a device for converting direct current (DC) power into alternating current (AC) power for driving an electric motor 10. The electric motor 10 may be configured to convert the supplied electric energy into mechanical energy. For example, the electric motor 10 may be a motor, a generator, a rotating electric machine, a linear electric machine, a synchronous electric motor, an induction electric motor, other types of similar devices, or any combination thereof. The power conversion device 1 includes a power conversion circuitry 100, a gate drive circuitry 200, a user interface 400, and a control circuitry 300.

The power conversion circuitry 100 converts DC power into AC power by switching on/off a plurality of semiconductor switching elements to switch each of a plurality of phase voltages to a voltage level in three levels including a first voltage, a second voltage higher than the first voltage, and a third voltage higher than the second voltage. For example, the power conversion circuitry 100 includes a DC power supply 101 and an inverter circuitry 102.

Although the DC power supply 101 is denoted by a single symbol for DC power supply in FIG. 1, it may include a plurality of DC power supplies serially connected to each other, or may include a plurality of DC power supplies provided in parallel to each other. The DC power supply 101 may include a capacitor to store DC power and may further include a rectifying circuitry to convert AC power into DC power and supply the converted DC power to the capacitor.

The inverter circuitry 102 converts DC power of the DC power supply 101 into AC power in multiple phases (for example, three phases). The on/off timing of a plurality of semiconductor switching elements in the inverter circuitry 102 is controlled by a gate signal from the gate drive circuitry 200. The inverter circuitry 102 thus switches the voltage of each of multiple phases (each of the plurality of phase voltages) to a voltage level in three levels including the first voltage, the second voltage, and the third voltage. By doing so, the inverter circuitry 102 generates AC power in multiple phases. For example, the inverter circuitry 102 includes DC buses 103 and 104, capacitors 105 and 106, a neutral point 107, a U-phase arm 110U, a V-phase arm 110V, and a W-phase arm 110W.

The DC bus 103 is connected to the positive electrode of the DC power supply 101, and the DC bus 104 is connected to the negative electrode of the DC power supply 101. Hereinafter, the DC bus 103 is referred to as a "positive electrode-side DC bus 103", and the DC bus 104 is referred to as a "negative electrode-side DC bus 104". The capacitors 105 and 106 are connected in series between the DC buses 103 and 104. The capacitor 105 is connected to the DC bus 103, and the capacitor 106 is connected to the DC bus 104. Hereinafter, the capacitor 105 is referred to as a "positive electrode-side capacitor 105", and the capacitor 106 is referred to as a "negative electrode-side capacitor 106". The neutral point 107 is the connection point between the capacitors 105 and 106.

Each of the U-phase arm 110U, the V-phase arm 110V, and the W-phase arm 110W includes an output line 111 for one phase, four switching elements 112, 113, 114, and 115, four free-wheel diodes 121, 122, 123, and 124, and two clamp diodes 125 and 126.

The switching elements 112 and 113 are connected in series between the DC bus 103 and the output line 111. The switching element 112 is connected to the DC bus 103, and the switching element 113 is connected to the output line 111. The switching elements 114 and 115 are connected in series between the output line 111 and the DC bus 104. The switching element 114 is connected to the output line 111, and the switching element 115 is connected to the DC bus 104. The switching elements 112, 113, 114, and 115 are semiconductor switching elements. Examples of the semiconductor switching elements include insulated gate bipolar transistors (IGBTs) and metal-oxide-semiconductor field effect transistors (MOSFETs).

The free-wheel diodes 121, 122, 123, and 124 are connected in parallel with the switching elements 112, 113, 114, and 115, respectively. In some examples, one or more of the diodes 121, 122, 123, and 124 are connected with the switching elements 112, 113, 114, and 115, respectively, in an anti-parallel configuration, in which the direction of the electric current flowing through the diode (for example, diode 121) and the direction of the electric current flowing through the switching element (for example, element 112) are opposite to each other. The clamp diode 125 is connected between the neutral point 107 and the connection point of the switching elements 112 and 113. The clamp diode 126 is connected between the connection point of the switching elements 114 and 115 and the neutral point 107.

In some examples, when the switching elements 112 and 113 are turned on and the switching elements 114 and 115 are turned off, the voltage of the output line 111 becomes substantially equal to the voltage of the positive electrode-side DC bus 103 (the third voltage). When the switching elements 114 and 115 are turned on and the switching elements 112 and 113 are turned off, the voltage of the output line 111 becomes substantially equal to the voltage of the negative electrode-side DC bus 104 (the first voltage). When the switching elements 113 and 114 are turned on and the switching elements 112 and 115 are turned off, the voltage of the output line 111 becomes substantially equal to the voltage of the neutral point 107 (the second voltage). Under neutral point control which is separately performed, the potential of the neutral point 107 is intermediate (half) between the voltage of the DC bus 103 and the voltage of the DC bus 104. In this way, each phase arm 110U, 110V, 110W switches the voltage of the output line 111 to any one of voltage of the negative electrode-side DC bus 104 (hereinafter referred to as "negative-side potential"), voltage of the neutral point 107 (hereinafter referred to as "zero potential"), and voltage of the positive electrode-side DC bus 103 (hereinafter referred to as "positive-side potential").

The gate drive circuitry 200 outputs a gate signal for switching on/off the switching elements 112, 113, 114, and 115 of each phase arm 110U, 110V, 110W. The user interface 400 displays information for users and acquires input from users. For example, the user interface 400 includes a display device such as a liquid crystal device and an input device such as a keypad. The display device and the input device may be integrated as a touch panel.

The control circuitry 300 controls a plurality of switching elements 112, 113, 114, and 115 so as to convert DC power into AC power without producing a combination (for example, a concurrent combination) of negative-side potential (first voltage) and positive-side potential (third voltage) between any two phases of a plurality of phase voltages (voltages of the output line 111 of each phase arm 110U, 110V, 110W).

The control circuitry 300 may be configured to execute a first mode control of controlling the plurality of switching elements 112, 113, 114, and 115 so as to convert DC power into AC power by producing a combination of negative-side potential and positive-side potential between any two phases of a plurality of phase voltages when the magnitude of a voltage command for the power conversion circuitry 100 is greater than a preset reference value. The control circuitry 300 may further be configured to execute a second mode control of controlling the plurality of switching elements 112, 113, 114, and 115 so as to convert DC power into AC power without producing a combination of negative-side potential and positive-side potential between any two phases of the plurality of phase voltages even when the magnitude of the voltage command is greater than the reference value. A mode switch of the control circuitry 300 of switching between the first mode control and the second mode control may be performed in response to a user input.

The control circuitry 300 may include, as a functional configuration (hereinafter referred to as a "functional module"), a voltage command calculator 311, a compensation processor 312, a PWM controller 313, and a mode switcher 314.

The voltage command calculator 311 calculates, for example, a voltage command for the power conversion circuitry 100, based on an induced voltage of the electric motor 10, a torque to be produced in the electric motor 10, and a magnetic pole position of the electric motor 10. In some examples, the induced voltage of the electric motor 10 may be based on a speed command input from the user interface 400. Additionally, the voltage command may comprise a command that defines a voltage to be produced in each of the U phase, the V phase, and the W phase.

The compensation processor 312 performs a variety of compensation processing on the voltage command calculated by the voltage command calculator 311. Examples of the compensation processing include compensation for variation in DC bus voltage and deadtime compensation.

The PWM controller 313 executes one of the first mode control and the second mode control. In the first mode control, the PWM controller 313 controls the plurality of switching elements 112, 113, 114, and 115 so as to convert DC power into AC power without producing a combination of negative-side potential and positive-side potential between any two phases of the plurality of phase voltages when the magnitude of the voltage command is smaller than the reference value. Additionally, the PWM controller 313 controls the plurality of switching elements 112, 113, 114, and 115 so as to convert DC power into AC power by producing a combination of negative-side potential and positive-side potential between any two phases of the plurality of phases when the magnitude of the voltage command is greater than the reference value.

In some examples, controlling the plurality of switching elements 112, 113, 114, and 115 so as to convert DC power into AC power without producing a combination of negative-side potential and positive-side potential between any two phases of the plurality of phase voltages is referred to as "two-level output control". Controlling the plurality of switching elements 112, 113, 114, and 115 so as to convert DC power into AC power by producing a combination of negative-side potential and positive-side potential between any two phases of the plurality of phase voltages is referred to as "three-level output control".

In the second mode control, the PWM controller 313 performs two-level output control both when the magnitude of the voltage command is smaller than the reference value and when the magnitude of the voltage command is greater than the reference value. The magnitude of the voltage command is, for example, the magnitude of one voltage vector obtained by combining voltages to be produced in the U phase, the V phase, and the W phase (for example, a voltage command vector described later).

Figure 2:
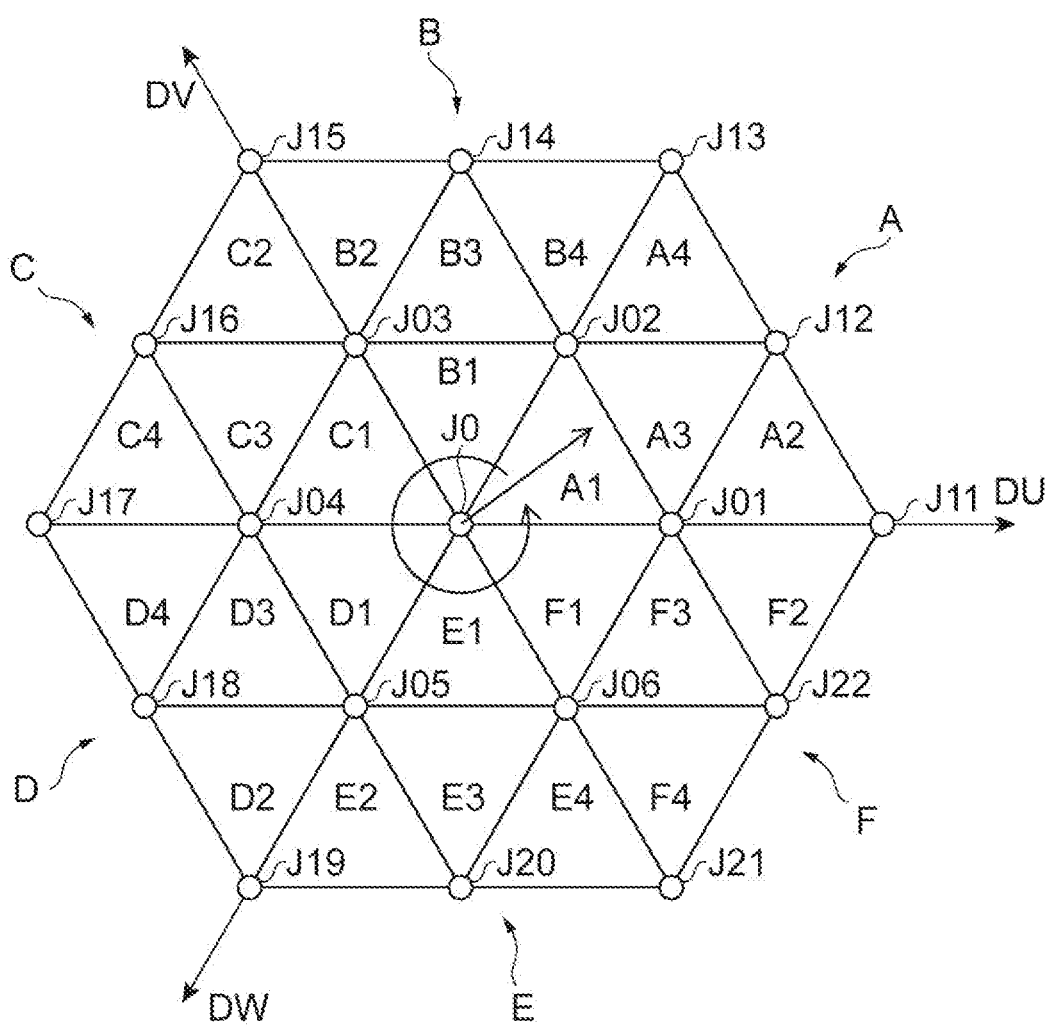
FIG. 2 is a vector diagram schematically illustrating the control performed by an example PWM controller.

Operating the power conversion circuitry 100 for converting DC power into AC power may include changing voltage between two phases of the plurality of phase voltages. Examples of such a technique include space vector modulation and triangle wave comparison modulation. Referring to FIG. 2, an example of space vector modulation is discussed below.

FIG. 2 is a vector diagram schematically illustrating a voltage generated by the power conversion circuitry 100 using vectors. A vector direction DU in FIG. 2 illustrates a direction of the voltage vector in the case where the voltage of the U phase relative to the V phase and the voltage of the U phase relative to the W phase are the same positive value. A vector direction DV at 120° from the vector direction DU illustrates a direction of the voltage vector in the case where the voltage of the V phase relative to the U phase and the voltage of the V phase relative to the W phase are the same positive value. A vector direction DW at 120° from the vector directions DU and DV illustrates a direction of the voltage vector in the case where the voltage of the W phase relative to the U phase and the voltage of the W phase relative to the V phase are the same positive value.

A point J0 in FIG. 2 shows a case where voltage is zero between any two phases of the U phase, the V phase, and the W phase. Three examples of such a case include: where all of the voltages of the U phase, the V phase, and the W phase are negative-side potential; where all of the voltages of the U phase, the V phase, and the W phase are zero potential; and where all of the voltages of the U phase, the V phase, and the W phase are positive-side potential.

A point J01 shows a case where the values of both of the voltage of the U phase relative to the V phase and the voltage of the U phase relative to the W phase are half the DC bus voltage. Two examples of such a case include: where the voltage of the U phase is positive-side potential and the voltages of the V phase and the W phase are zero potential; and where the voltage of the U phase is zero potential and the voltages of the V phase and the W phase are negative-side potential. A point J02 shows a case where the values of both of the voltage of the U phase relative to the W phase and the voltage of the V phase relative to the W phase are half the DC bus voltage. Two examples of such a case include: where the voltages of the U phase and the V phase are positive-side potential and the voltage of the W phase is zero potential; and where the voltages of the U phase and the V phase are zero potential and the voltage of the W phase is negative-side potential. A point J03 shows a case where the values of both of the voltage of the V phase relative to the U phase and the voltage of the V phase relative to the W phase are half the DC bus voltage. Two examples of such a case include: where the voltage of the V phase is positive-side potential and the voltages of the U phase and the W phase are zero potential; and where the voltage of the V phase is zero potential and the voltages of the U phase and the W phase are negative-side potential. A point J04 shows a case where the values of both of the voltage of the V phase relative to the U phase and the voltage of the W phase relative to the U phase are half the DC bus voltage. Two examples of such a case include: where the voltages of the V phase and the W phase are positive-side potential and the voltage of the U phase is zero potential; and where the voltages of the V phase and the W phase are zero potential and the voltage of the U phase is negative-side potential. A point J05 shows a case where the values of both of the voltage of the W phase relative to the U phase and the voltage of the W phase relative to the V phase are half the DC bus voltage. Two examples of such a case include: where the voltage of the W phase is positive-side potential and the voltages of the U phase and the V phase are zero potential; and where the voltage of the W phase is zero potential and the voltages of the U phase and the V phase are negative-side potential. A point J06 shows a case where the values of both of the voltage of the U phase relative to the V phase and the voltage of the W phase relative to the V phase are half the DC bus voltage. Two examples of such a case include: where the voltages of the U phase and the W phase are positive-side potential and the voltage of the V phase is zero potential; and where the voltages of the U phase and the W phase are zero potential and the voltage of the V phase is negative-side potential.

A point J11 shows a case where both of the voltage of the U phase relative to the V phase and the voltage of the U phase relative to the W phase are DC bus voltage. An example of such a case is where the voltage of the U phase is positive-side potential and the voltages of the V phase and the W phase are negative-side potential. A point J12 shows a case where both of the voltage of the V phase relative to the W phase and the voltage of the U phase relative to the V phase are half the DC bus voltage and the voltage of the U phase relative to the W phase is DC bus voltage. An example of such a case is where the voltage of the U phase is positive-side potential, the voltage of the V phase is zero potential, and the voltage of the W phase is negative-side potential. A point J13 shows a case where both of the voltage of the U phase relative to the W phase and the voltage of the V phase relative to the W phase are DC bus voltage. An example of such a case is where the voltages of the U phase and the V phase are positive-side potential and the voltage of the W phase is negative-side potential.

A point J14 shows a case where both of the voltage of the U phase relative to the W phase and the voltage of the V phase relative to the U phase are half the DC bus voltage and the voltage of the V phase relative to the W phase is DC bus voltage. An example of such a case is where the voltage of the V phase is positive-side potential, the voltage of the U phase is zero potential, and the voltage of the W phase is negative-side potential. A point J15 shows a case where both of the voltage of the V phase relative to the U phase and the voltage of the V phase relative to the W phase are DC bus voltage. An example of such a case is where the voltage of the V phase is positive-side potential and the voltages of the U phase and the W phase are negative-side potential.

A point J16 shows a case where both of the voltage of the W phase relative to the U phase and the voltage of the V phase relative to the W phase are half the DC bus voltage and the voltage of the V phase relative to the U phase is DC bus voltage. An example of such a case is where the voltage of the V phase is positive-side potential, the voltage of the W phase is zero potential, and the voltage of the U phase is negative-side potential. A point J17 shows a case where both of the voltage of the V phase relative to the U phase and the voltage of the W phase relative to the U phase are DC bus voltage. An example of such a case is where the voltages of the V phase and the W phase are positive-side potential and the voltage of the U phase is negative-side potential.

A point J18 shows a case where both of the voltage of the V phase relative to the U phase and the voltage of the W phase relative to the V phase are half the DC bus voltage and the voltage of the W phase relative to the U phase is DC bus voltage. An example of such a case is where the voltage of the W phase is positive-side potential, the voltage of the V phase is zero potential, and the voltage of the U phase is negative-side potential. A point J19 shows a case where both of the voltage of the W phase relative to the U phase and the voltage of the W phase relative to the V phase are DC bus voltage. An example of such a case is where the voltage of the W phase is positive-side potential and the voltages of the U phase and the V phase are negative-side potential.

A point J20 shows a case where both of the voltage of the U phase relative to the V phase and the voltage of the W phase relative to the U phase are half the DC bus voltage and the voltage of the W phase relative to the V phase is DC bus voltage. An example of such a case is where the voltage of the W phase is positive-side potential, the voltage of the U phase is zero potential, and the voltage of the V phase is negative-side potential. A point J21 shows a case where both of the voltage of the U phase relative to the V phase and the voltage of the W phase relative to the V phase are DC bus voltage. An example of such a case is where the voltages of the U phase and the W phase are positive-side potential and the voltage of the V phase is negative-side potential.

A point J22 shows a case where both of the voltage of the W phase relative to the V phase and the voltage of the U phase relative to the W phase are half the DC bus voltage and the voltage of the U phase relative to the V phase is DC bus voltage. An example of such a case is where the voltage of the U phase is positive-side potential, the voltage of the W phase is zero potential, and the voltage of the V phase is negative-side potential.

In some examples, a region between the vector direction DU and a direction opposite to the vector direction DW is referred to as "region A", a region between a direction opposite to the vector direction DW and the vector direction DV is referred to as "region B", a region between the vector direction DV and a direction opposite to the vector direction DU is referred to as "region C", a region between a direction opposite to the vector direction DU and the vector direction DW is referred to as "region D", a region between the vector direction DW and a direction opposite to the vector direction DV is referred to as "region E", and a region between a direction opposite to the vector direction DV and the vector direction DU is referred to as "region F".

In the region A, a triangular region with the points J0, J01, and J02 as vertexes is referred to as "region A1", a triangular region with the points J01, J11, and J12 as vertexes is referred to as "region A2", a triangular region with the points J01, J12, and J02 as vertexes is referred to as "region A3", and a triangular region with the points J02, J12, and J13 as vertexes is referred to as "region A4".

In the region B, a triangular region with the points J0, J02, and J03 as vertexes is referred to as "region B1", a triangular region with the points J02, J13, and J14 as vertexes is referred to as "region B4", a triangular region with the points J02, J14, and J03 as vertexes is referred to as "region B3", and a triangular region with the points J03, J14, and J15 as vertexes is referred to as "region B2".

In the region C, a triangular region with the points J0, J03, and J04 as vertexes is referred to as "region C1", a triangular region with the points J03, J15, and J16 as vertexes is referred to as "region C2", a triangular region with the points J03, J16, and 104 as vertexes is referred to as "region C3", and a triangular region with the points J04, J16, and J17 as vertexes is referred to as "region C4".

In the region D, a triangular region with the points J00, J04, and J05 as vertexes is referred to as "region D1", a triangular region with the points J04, J17, and J18 as vertexes is referred to as "region D4", a triangular region with the points J04, J18, and J05 as vertexes is referred to as "region D3", and a triangular region with the points J05, J18, and J19 as vertexes is referred to as "region D2".

In the region E, a triangular region with the points J0, J05, and J06 as vertexes is referred to as "region E1", a triangular region with the points J05, J19, and J20 as vertexes is referred to as "region E2", a triangular region with the points J05, J20, and J06 as vertexes is referred to as "region E3", and a triangular region with the points J06, J20, and J21 as vertexes is referred to as "region E4".

In the region F, a triangular region with the points J00, J06, and J01 as vertexes is referred to as "region F1", a triangular region with the points J06, J21, and J22 as vertexes is referred to as "region F4", a triangular region with the points J06, J22, and J01 as vertexes is referred to as "region F3", and a triangular region with the points J01, J22, and J11 as vertexes is referred to as "region F2".

The voltage states of the U phase, the V phase, and the W phase are shown by voltage vectors with the point J00 as the origin. When space vector modulation is performed, the PWM controller 313 switches the voltages of the U phase, the V phase, and the W phase such that the voltage vector is rotated about the point J0 with cycles corresponding to the moving speed of the magnetic poles of the electric motor 10.

An example method of generating a voltage vector with its tip positioned in the region A is illustrated below. In the region A, a voltage vector with its tip positioned in the region A1 is generated by a combination of the voltage states at the points J0, J01, and J02, referred to as "control of the region A1". For example, in the control of the region A1, the direction and the length of a voltage vector produced in a predetermined control cycle can be adjusted by adjusting the ratio of the periods of the voltage states at the points J0, J01, and J02 in the control cycle. As described above, in the voltage states at the points J0, J01, and J02, a combination of negative-side potential and positive-side potential does not occur in any two phases of the three phases. The control of the region A1 provides an example of the two-level output control.

In the region A, a voltage vector with its tip positioned in the region A2 is generated by a combination of the voltage states at the points J01, J11, and J12, referred to as "control of the region A2". For example, in the control of the region A2, the direction and the length of the voltage vector can be adjusted by adjusting the ratio of the periods of the voltage states at the points J01, J11, and J12 in a predetermined control cycle.

A voltage vector with its tip positioned in the region A3 is generated by a combination of the voltage states at the points J01, J02, and J12, referred to as "control of the region A3". For example, in the control of the region A3, the direction and the length of the voltage vector can be adjusted by adjusting the ratio of the periods of the voltage states at the points J01, J02, and J12 in a predetermined control cycle.

A voltage vector with its tip positioned in the region A4 is generated by a combination of the voltage states at the points J02, J12, and J13, referred to as "control of the region A4". For example, in the control of the region A4, the direction and the length of the voltage vector can be adjusted by adjusting the ratio of the periods of the voltage states at the points J02, J12, and J13 in a predetermined control cycle.

As described above, in the voltage states at the points J11, J12, and J13, a combination of negative-side potential and positive-side potential occurs between any two phases of the three phases. The control of the region A2, the control of the region A3, and the control of the region A4 provide an example of the three-level output control.

An example method of generating a voltage vector with its tip positioned in the region B may include changing "A" to "B" and interchanging "U phase" and "V phase" in the description for the region A. Like the control of the region A1, the control of the region B1 provides an example of the two-level output control. Like the control of the region A2, the control of the region A3, and the control of the region A4, the control of the region B2, the control of the region B3, and the control of the region B4 provide an example of the three-level output control.

An example method of generating a voltage vector with its tip positioned in the region C may include changing "A" to "C", changing "U phase" to "W phase", changing "V phase" to "U phase", and changing "W phase" to "V phase" in the description for the region A. Like the control of the region A1, the control of the region C1 provides an example of the two-level output control. Like the control of the region A2, the control of the region A3, and the control of the region A4, the control of the region C2, the control of the region C3, and the control of the region C4 provide an example of the three-level output control.

An example method of generating a voltage vector with its tip positioned in the region D may include changing "A" to "D" and interchanging "U phase" and "W phase" in the description for the region A. Like the control of the region A1, the control of the region D1 provides an example of the two-level output control. Like the control of the region A2, the control of the region A3, and the control of the region A4, the control of the region D2, the control of the region D3, and the control of the region D4 provide an example of the three-level output control.

An example method of generating a voltage vector with its tip positioned in the region E may include changing "A" to "E", changing "U phase" to "V phase", changing "V phase" to "W phase", and changing "W phase" to "U phase" in the description for the region A. Like the control of the region A1, the control of the region E1 provides an example of the two-level output control. Like the control of the region A2, the control of the region A3, and the control of the region A4, the control of the region E2, the control of the region E3, and the control of the region E4 provide an example of the three-level output control.

An example method of generating a voltage vector with its tip positioned in the region F may include changing "A" to "F" and interchanging "V phase" and "W phase" in the description for the region A. Like the control of the region A1, the control of the region F1 provides an example of the two-level output control. Like the control of the region A2, the control of the region A3, and the control of the region A4, the control of the region F2, the control of the region F3, and the control of the region F4 provide an example of the three-level output control.

In an example first mode control, the PWM controller 313 executes the two-level output control (the control of the regions A1, B1, C1, D1, E1, and F1) when the magnitude of a voltage command vector (a vector that defines a voltage vector to be generated) is smaller than the reference value. Additionally, the PWM controller 313 performs the three-level output control (the control of the regions A2, A3, A4, B4, B3, B2, C2, C3, C4, D4, D3, D2, E2, E3, E4, F4, F3, and F2) when the magnitude of the voltage command vector is greater than the reference value. The reference value is set, for example, to a value on the outer edge of the regions A1, B1, C1, D1, E1, and F1. In some examples, the reference value changes with the direction of the voltage command vector.

Figure 3:
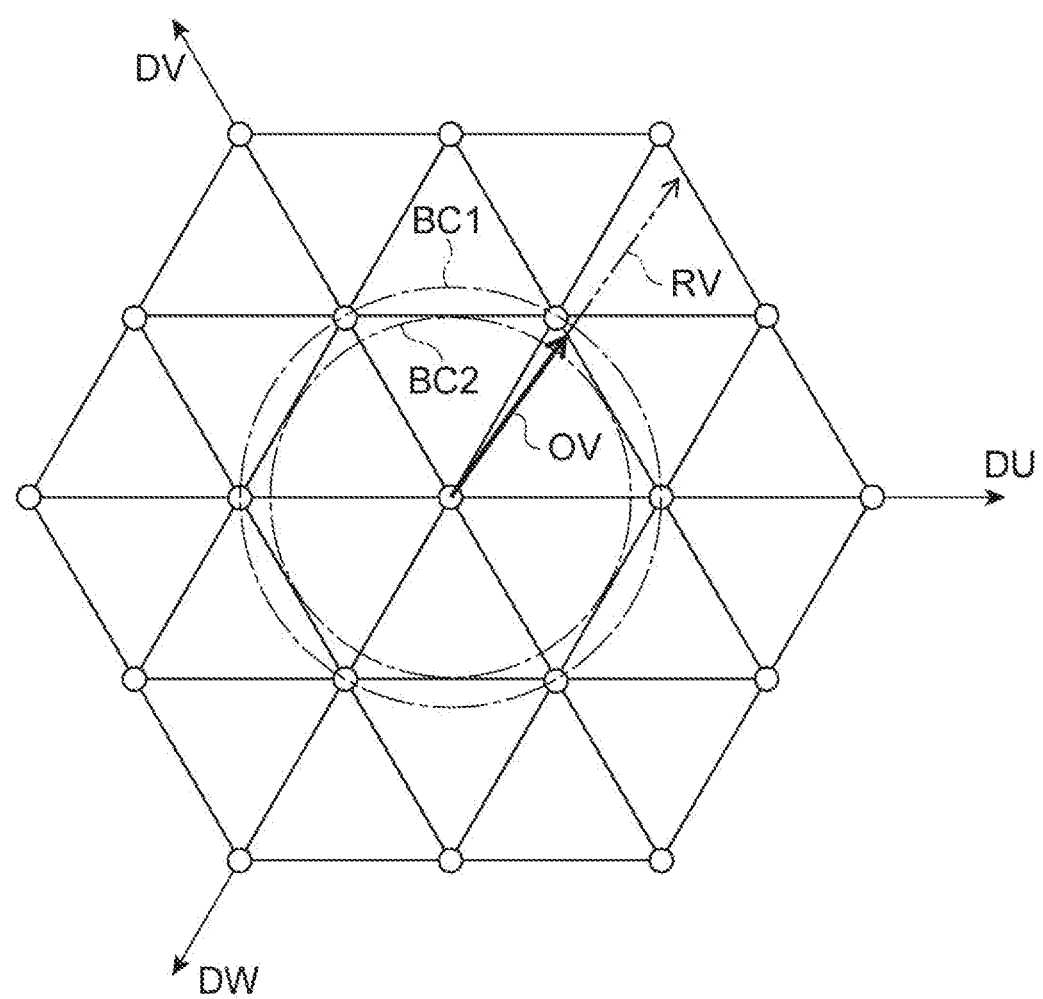
FIG. 3 is a diagram illustrating an execution result of an example voltage restriction.

In an example second mode control, the PWM controller 313 selectively executes the two-level output control without performing the three-level output control. The PWM controller 313 may execute the two-level output control even when the magnitude of the voltage command vector is greater than the reference value. As illustrated in FIG. 3, therefore, even when the tip of a voltage command vector RV is positioned in the region A4, the PWM controller 313 controls the plurality of switching elements 112, 113, 114, and 115 so as to generate a voltage vector OV in which the magnitude of the voltage command vector RV is reduced to the boundary between the region A1 and the region A3. With the second mode control, both when the modulation ratio of the voltage command vector is less than 0.5 and when it exceeds 0.577 (=1/√3), the control of the regions A1, B1, C1, D1, E1, and F1 is executed. As used herein the modulation ratio is the ratio of the magnitude of the voltage command vector to the magnitude of DC bus voltage. In FIG. 3, a circle BC1 circumscribing the regions A1, B1, C1, D1, E1, and F1 corresponds to the modulation ratio 0.577, and a circle BC2 inscribed in the regions A1, B1, C1, D1, E1, and F1 corresponds to the modulation ratio 0.5. When the modulation ratio of the voltage command vector is 0.5 to 0.577, the three-level output control may be performed if the magnitude of the voltage command vector is greater than the reference value.

In an example second mode control, the PWM controller 313 may control the power conversion circuitry 100 so as to repeat both of a first state in which a voltage is produced between at least two phases of the plurality of phase voltages without bringing any of the plurality of phase voltages to positive-side potential and a second state in which a voltage is produced between at least two phases of the plurality of phase voltages without bringing any of the plurality of phase voltages to negative-side potential.

The PWM controller 313 may control the power conversion circuitry 100 so as to bring all of the plurality of phase voltages to zero potential between the first state and the second state (for example, during a transitional state between the first state and the second state). The PWM controller 313 may control the power conversion circuitry 100 so as to bring all of the plurality of phase voltages to negative-side potential between the first state and the first state (for example, during a transitional state between a first instance of the first state and a second instance of the first state). The PWM controller 313 may control the power conversion circuitry 100 so as to bring all of the plurality of phase voltages to positive-side potential between the second state and the second state (for example, during a transitional state between a first instance of the second state and a second instance of the second state). Additionally, the PWM controller 313 may control the power conversion circuitry 100 so as to repeat each of the first state and the second state twice (for example, control the power conversion circuitry 100 to place the semiconductor switching elements 112, 113, 114, and 115 in a first instance of the first state and a second instance of the first state, and to place the semiconductor switching elements 112, 113, 114, and 115 in a first instance of the second state and a second instance of the second state, so as to repeat the first state and the second state).

Figure 4:
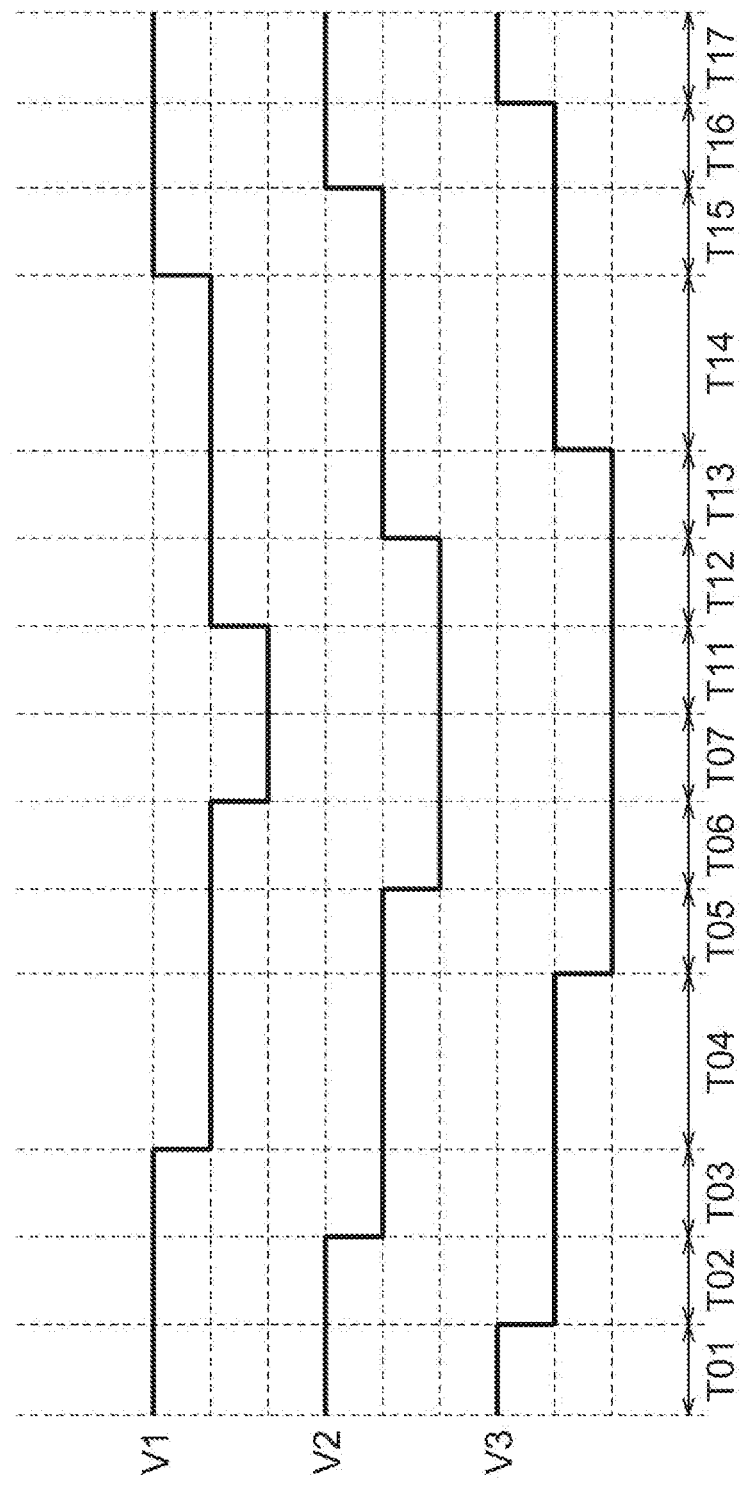
FIG. 4 is a timing chart illustrating an example voltage transition of each phase in a first mode control.

Referring to FIG. 4, an example transition pattern between the first state and the second state in a control cycle is described. A voltage transition V1 in FIG. 4 shows a transition of voltage of the U phase in the region A1. A voltage transition V2 shows a transition of voltage of the V phase in the region A1. A voltage transition V3 shows a transition of voltage of the W phase in the region A1.

In an initial period T01 in the control cycle, all of the U phase, the V phase, and the W phase are positive-side potential. For example, a voltage state in period T01 is the voltage state at the point J0. In the next period T02, the U phase and the V phase are positive-side potential and the W phase is zero potential. For example, the voltage state in period T02 is the voltage state at the point J02. In the next period T03, the U phase is positive-side potential and the V phase and the W phase are zero potential. For example, the voltage state in period T03 is the voltage state at the point 101. In the next period T04, all of the U phase, the V phase, and the W phase are zero potential. For example, the voltage state in period T04 is the voltage state at the point J0. In the next period T05, the U phase and the V phase are zero potential and the W phase is negative-side potential. For example, the voltage state in period T05 is the voltage state at the point J02. In the next period T06, the U phase is zero potential and the V phase and the W phase are negative-side potential. For example, the voltage state in period T06 is the voltage state at the point J01. In the next period T07, all of the U phase, the V phase, and the W phase are negative-side potential. For example, the voltage state in period T07 is the voltage state at the point J0.

The voltage states in the following periods T11, T12, T13, T14, T15, T16, and T17 are equal to the voltage states in periods T07, T06, T05, T04, T03, T02, and T01, respectively. For example, in periods T11, T12, T13, T14, T15, T16, and T17, the same voltage states as in T01, T02, T03, T04, T05, T06, and T07 may be reproduced in the reverse order.

In an example transition pattern, the voltage states in periods T02, T05, T13, and T16 are the voltage state at the point J02, the voltage states in periods T03, T06, T12, and T15 are the voltage state at the point J01, and the voltage states in all the other periods are the voltage state at the point J0. Then, the direction and the magnitude of the voltage vector in the region A1 are adjusted by adjusting the ratio between the total of periods T02, T05, T13, and T16, the total of periods T03, T06, T12, and T15, and the total of the other periods.

In periods T02 and T03, a voltage may be produced between at least two phases without bringing any of the plurality of phase voltages to negative-side potential. The voltage state in periods T02 and T03 therefore corresponds to the second state. In periods T05 and T06, a voltage is produced between at least two phases without bringing any of the plurality of phase voltages to positive-side potential. The voltage state in periods T05 and T06 therefore corresponds to the first state. In periods T12 and T13, a voltage is produced between at least two phases without bringing any of the plurality of phase voltages to positive-side potential. The voltage state in periods T12 and T13 therefore corresponds to the first state. In periods T15 and T16, a voltage is produced between at least two phases without bringing any of the plurality of phase voltages to negative-side potential. The voltage state in periods T15 and T16 therefore corresponds to the second state. In some examples, two first states and two second states are included in one control cycle such that the first state and the second state are each repeated twice.

In period T04 between periods T02, T03 in the second state and periods T05, T06 in the first state, all of the U phase, the V phase, and the W phase are zero potential. Similarly, in period T14 between periods T12, T13 in the first state and periods T15, T16 in the second state, all of the U phase, the V phase, and the W phase are zero potential. In periods T07, T11 between periods T05, T06 in the first state and periods T12, T13 in the first state, all of the U phase, the V phase, and the W phase are negative-side potential. In periods T17, T01 between periods T15, T16 in the second state and periods T02, T03 in the second state, all of the U phase, the V phase, and the W phase are positive-side potential. In such a transition pattern, selectively changing the voltage of any one of the phases enables a transition to the next period in all the periods.

The transition pattern in FIG. 4 applies to all of the regions B1, C1, D1, E1, and F1 by changing the correspondence of voltage transitions V1, V2, and V3 to the U phase, the V phase, and the W phase. When the transition pattern in FIG. 4 shows a transition pattern in the region B1, the voltage transition V1 shows a transition of voltage of the V phase, the voltage transition V2 shows a transition of voltage of the U phase, and the voltage transition V3 shows a transition of voltage of the W phase. When the transition pattern in FIG. 4 shows a transition pattern in the region C1, the voltage transition V1 shows a transition of voltage of the V phase, the voltage transition V2 shows a transition of voltage of the W phase, and the voltage transition V3 shows a transition of voltage of the U phase. When the transition pattern in FIG. 4 shows a transition pattern in the region D1, the voltage transition V1 shows a transition of voltage of the W phase, the voltage transition V2 shows a transition of voltage of the V phase, and the voltage transition V3 shows a transition of voltage of the U phase. When the transition pattern in FIG. 4 shows a transition pattern in the region E1, the voltage transition V1 shows a transition of voltage of the W phase, the voltage transition V2 shows a transition of voltage of the U phase, and the voltage transition V3 shows a transition of voltage of the V phase. When the transition pattern in FIG. 4 shows a transition pattern in the region F1, the voltage transition V1 shows a transition of voltage of the U phase, the voltage transition V2 shows a transition of voltage of the W phase, and the voltage transition V3 shows a transition of voltage of the V phase.

Returning to FIG. 1, the mode switcher 314 executes a mode switch of switching between the first mode control and the second mode control. In some examples, the mode switch is performed by the PWM controller 313 in response to a user input. For example, the mode switcher 314 acquires input for selecting one of the first mode control and the second mode control from the user interface 400 and performs a mode switch in accordance with the input.

The example functional modules of the control circuitry 300 may be modified in arrangement and detail.

Figure 5:
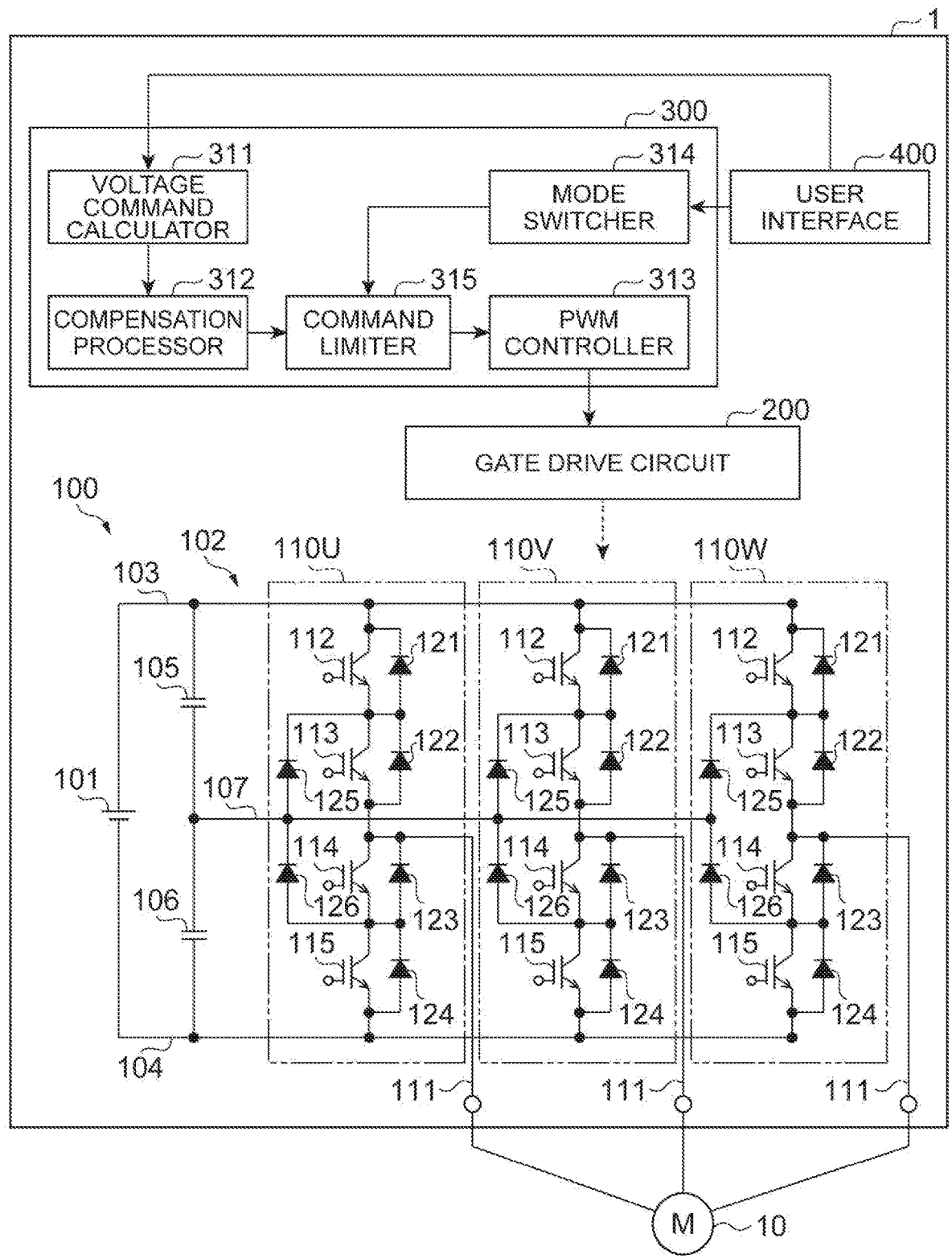
FIG. 5 is a diagram illustrating another example power conversion device.

For example, as illustrated in FIG. 5, the control circuitry 300 may further include a command limiter 315. The command limiter 315 limits the magnitude of the voltage command input from the compensation processor 312 to the PWM controller 313 such that the first mode control and the second mode control are switched in accordance with the setting by the mode switcher 314.

By way of additional example, when the control circuitry 300 executes the second mode control, the command limiter 315 restricts the magnitude of the voltage command input from the compensation processor 312 to the PWM controller 313 to the reference value or smaller. With this configuration, the PWM controller 313 does not perform the control of the regions A2, A3, A4, B4, B3, B2, C2, C3, C4, D4, D3, D2, E2, E3, E4, F4, F3, and F2, and the PWM controller 313 selectively performs the control of the regions A1, B1, C1, D1, E1, and F1.

Figure 6:
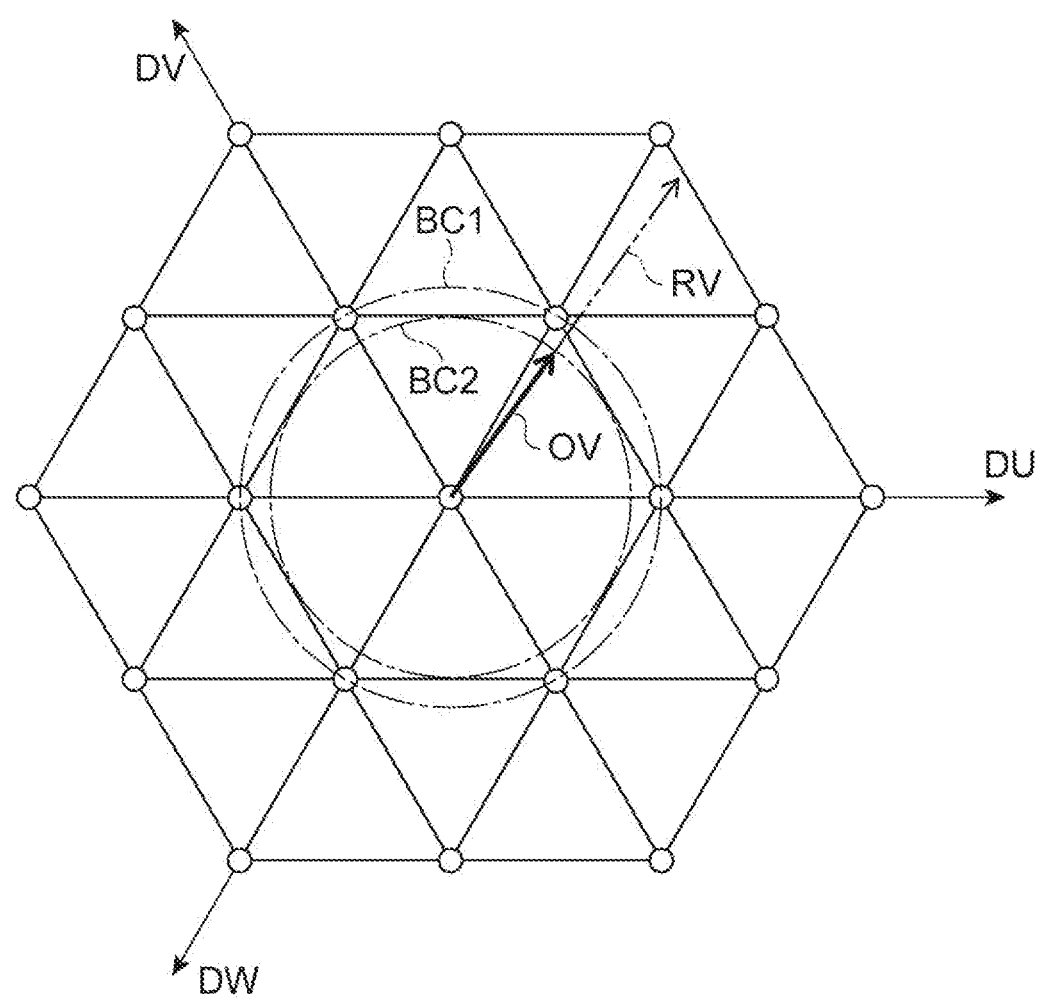
FIG. 6 is a diagram illustrating an execution result of another example voltage restriction.

The command limiter 315 may be configured to limit the modulation ratio of the voltage command input from the compensation processor 312 to the PWM controller 313. For example, when the control circuitry 300 executes the second mode control, the command limiter 315 may be configured to set the modulation ratio of the voltage command input from the compensation processor 312 to the PWM controller 313 to 0.5 or smaller. In some examples, the voltage vector generated in the second mode control is limited to the magnitude within the circle BC2 inscribed in the regions A1, B1, C1, D1, E1, and F1 (see FIG. 6).

Figure 7:
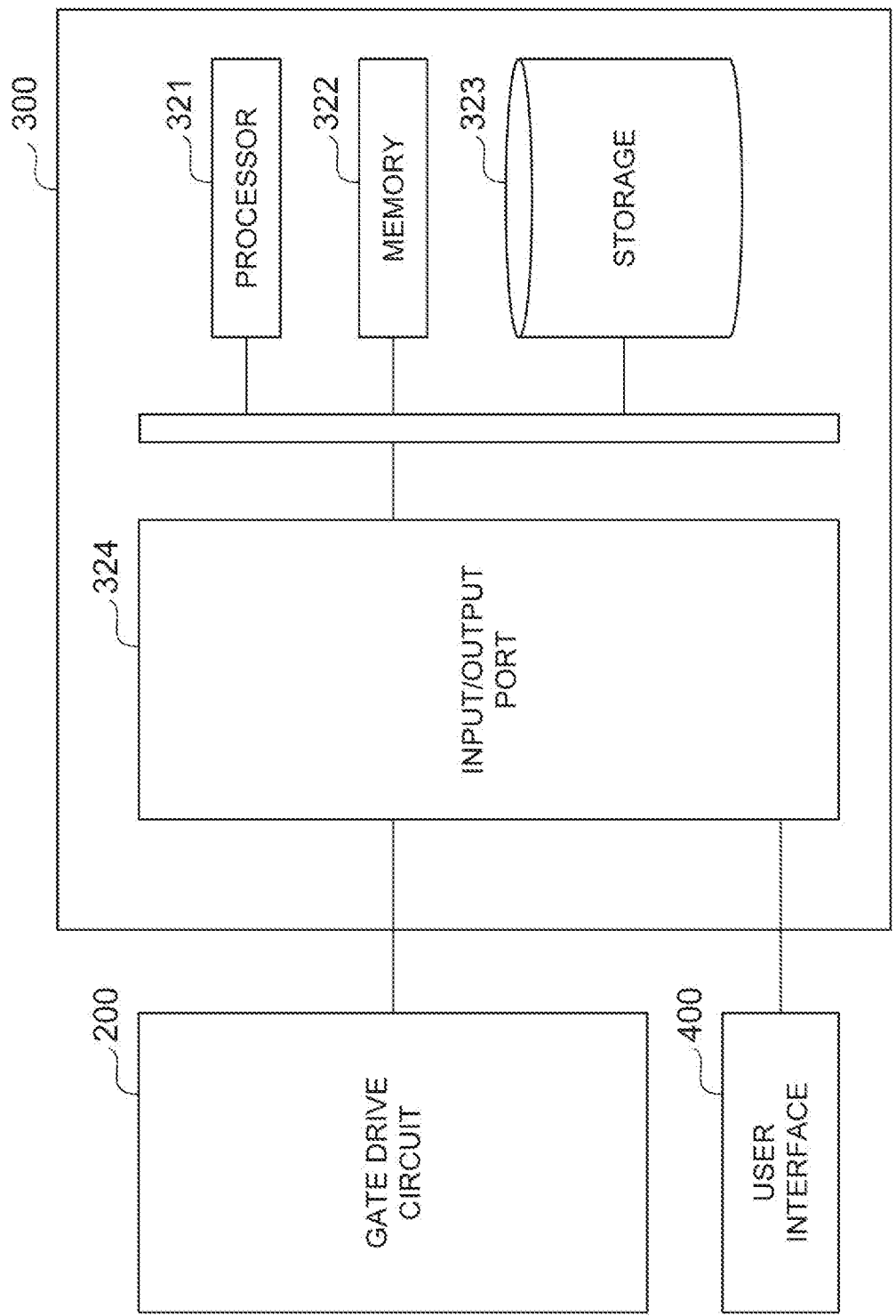
FIG. 7 is a block diagram illustrating a hardware configuration of an example control circuitry.

FIG. 7 is a block diagram illustrating an example hardware configuration of the control circuitry 300. The control circuitry 300 includes at least one processor 321, a non-transitory memory device 322, a storage 323, and an input/output port 324. The storage 323 has, for example, a computer-readable storage medium such as a hard disk. The storage medium stores a program for causing the control circuitry 300 to execute a control procedure, which is described in further detail later. The storage medium may be a nonvolatile semiconductor or a removable medium such as a magnetic disc and an optical disc. The memory 322 temporarily stores a program loaded from the storage medium in the storage 323 and the operation result by the processor 321. The processor 321 executes the program in cooperation with the memory 322 to configure the foregoing functional modules. The input/output port 324 inputs/outputs an electrical signal between the user interface 400 and the gate drive circuitry 200 in accordance with a command from the processor 321.

Control Method for Power Conversion Device

An example control procedure executed by the control circuitry 300 is described with reference to an example control method for the power conversion circuitry 100. The example procedure includes determining an on/off switching timing of the plurality of switching elements 112, 113, 114, and 115 so as to convert DC power into AC power without producing a combination of negative-side potential and positive-side potential between any two phases of the plurality of phase voltages in the power conversion circuitry 100. Additionally, the procedure may include controlling the power conversion circuitry 100 so as to switch the on/off the plurality of switching elements 112, 113, 114, and 115 at the determined timing.

The example procedure may include a first mode control of controlling the plurality of switching elements 112, 113, 114, and 115 so as to convert DC power into AC power by producing a combination of negative-side potential and positive-side potential between any two phases of the plurality of phase voltages when the magnitude of a voltage command for the power conversion circuitry 100 is greater than a preset reference value. The procedure may also include a second mode control of controlling the plurality of switching elements 112, 113, 114, and 115 so as to convert DC power into AC power without producing a combination of negative-side potential and positive-side potential between any two phases of the plurality of phase voltages even when the magnitude of the voltage command is greater than the reference value. Additionally, the procedure may include a mode switch of switching between the first mode control and the second mode control is to be performed in response to a user input.

Figure 8:
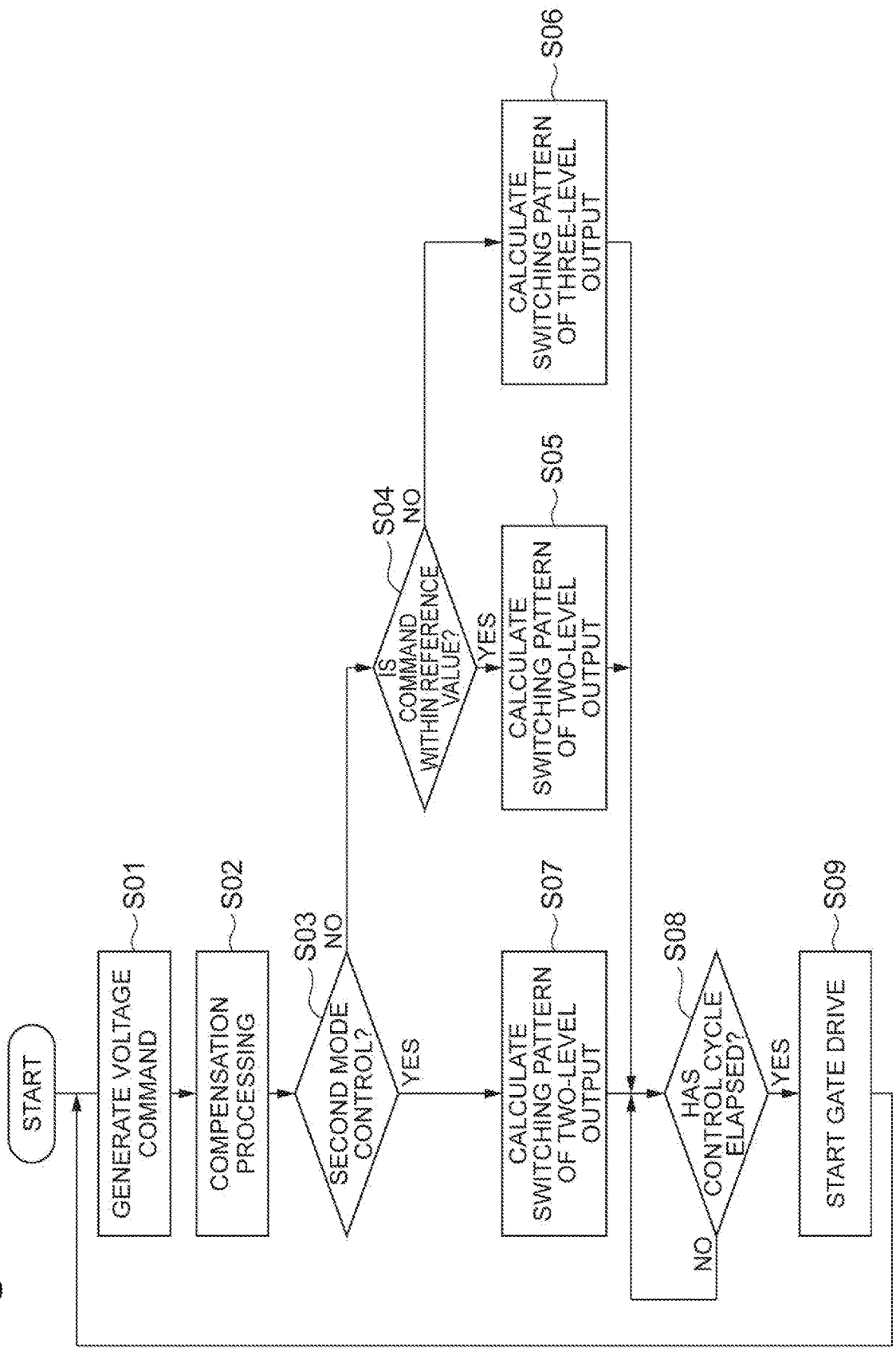
FIG. 8 is a flowchart illustrating an example control procedure of the power conversion device.

In an example procedure, as illustrated in FIG. 8, the control circuitry 300 executes steps (operations) S01, S02, and S03. In step S01, the voltage command calculator 311 generates a voltage command for the power conversion circuitry 100. In step S02, the compensation processor 312 executes the compensation processing for the voltage command. In step S03, the PWM controller 313 confirms whether the second mode control is designated by the mode switcher 314.

If it is determined that the second mode control is not designated in step S03, the control circuitry 300 executes step S04. In step S04, the PWM controller 313 confirms whether the magnitude of the voltage command is within the reference value.

If it is determined that the magnitude of the voltage command is within the reference value in step S04, the control circuitry 300 executes step S05. In step S05, the PWM controller 313 sets a switching timing (hereinafter referred to as "switching pattern") of the switching elements 112, 113, 114, and 115 for performing the two-level output control in accordance with the voltage command.

If it is determined that the magnitude of the voltage command is not within the reference value in step S04, the control circuitry 300 executes step S06. In step S06, the PWM controller 313 sets a switching pattern for performing the three-level output control in accordance with the voltage command.

If it is determined that the second mode control is designated in step S03, the control circuitry 300 executes step S07. In step S07, the PWM controller 313 sets a switching pattern for performing the two-level output control in accordance with the voltage command, irrespective of the magnitude of the voltage command.

After steps S05, S06, and S07, the control circuitry 300 executes steps S08 and S09. In step S08, the PWM controller 313 waits for the elapse of a preset control cycle. In step S09, the PWM controller 313 starts the control of the switching elements 112, 113, 114, and 115 in accordance with the switching pattern set in steps S05, S06, and S07. Upon starting this control, the control circuitry 300 returns the process to step S01. Thus, before completion of the control of the switching elements 112, 113, 114, and 115, a switching pattern for the next control cycle is set. One of the first mode control or the second mode control may thereafter be repeated in response to a user input.

In some examples, the power conversion device 1 includes the power conversion circuitry 100 configured to convert DC power into AC power by switching on/off a plurality of switching elements 112, 113, 114, and 115 to switch each of a plurality of phase voltages to a voltage level in three levels including a first voltage, a second voltage higher than the first voltage, and a third voltage higher than the second voltage. Additionally, the power conversion device may include the control circuitry 300 configured to control the plurality of switching elements 112, 113, 114, and 115 so as to convert DC power into AC power without producing a combination of the first voltage and the third voltage between any two phases of the plurality of phase voltages.

The power conversion circuitry 100 may be configured to selectively switch the voltage for each output line to any one of three levels, namely, the first voltage, the second voltage, and the third voltage, in order to suppress the voltage between lines (the voltage between the output lines) to at most half the maximum value (the maximum value that can be generated by the power conversion circuitry). Accordingly, the power conversion circuitry 100 for AC power can be used to match a voltage on the power supply side with a voltage supplied to a load to provide a simplified configuration for matching a voltage on the power supply side with a voltage supplied to a load.

The control circuitry 300 may control the power conversion circuitry 100 so as to repeat both of a first state in which a voltage is produced between at least two phases of the plurality of phase voltages without bringing any of a plurality of phase voltages to the third voltage and a second state in which a voltage is produced between at least two phases of the plurality of phase voltages without bringing any of the plurality of phase voltages to the first voltage. The capacitor 106 and the switching elements 114 and 115 for outputting the first voltage lower than the second voltage as well as the capacitor 105 and the switching elements 112 and 113 for outputting the third voltage higher than the second voltage may therefore operate in a balanced manner to reduce the burden on the power conversion circuitry 100.

The control circuitry 300 may control the power conversion circuitry 100 so as to bring all of the plurality of phase voltages to the second voltage between the first state and the second state. In a case where all of multiple phases are brought to the first voltage or the third voltage to bring the phase-to-phase voltage to zero between the first state and the second state, all of the voltages of the plurality of output lines are simultaneously switched. By contrast, by using an example control described herein, all of the plurality of output lines may be brought to the second voltage to bring the voltage between the output lines to zero between the first state and the second state. This control can reduce the number of output lines that utilize switching of voltage in a transition between the first state and the second state and suppress noise resulting from frequent voltage switching.

The control circuitry 300 may control the power conversion circuitry 100 so as to bring all of the plurality of phase voltages to the first voltage between the first state and the first state. In some examples, both in the first state immediately before a transition from the first state to the second state and in the first state immediately after a transition from the second state to the first state, the concentration of voltage switching on some output lines can be suppressed. For example, when a pulse-like voltage is to be produced between two output lines in the first state immediately before a transition, after voltage of one of the output lines is switched from the first voltage to the second voltage, the voltage of this output line is not returned to the first voltage but the voltage of the other output line is switched from the first voltage to the second voltage, whereby the voltage between those two output lines can be returned to zero. This configuration therefore can suppress noise resulting from frequent voltage switching.

The control circuitry 300 may control the power conversion circuitry 100 so as to bring all of the plurality of phase voltages to the third voltage between the second state and the second state. In some examples, both in the second state immediately after a transition from the first state to the second state and in the second state immediately before a transition from the second state to the first state, concentration of voltage switching on some output lines can be suppressed. For example, when a pulse-like voltage is to be produced between two output lines in the first state immediately after a transition, after the voltage of one of the output lines is switched from the second voltage to the third voltage, the voltage of this output line is not returned to the second voltage but the voltage of the other output line is switched from the second voltage to the third voltage, whereby the voltage between those two output lines can be returned to zero. This configuration therefore can suppress switching noise in PWM control.

The control circuitry 300 may control the power conversion circuitry 100 so as to repeat each of the first state and the second state twice and to suppress switching noise in PWM control.

The control circuitry 300 may be configured to execute a first mode control of controlling the plurality of switching elements 112, 113, 114, and 115 so as to convert DC power into AC power by producing a combination of the first voltage and the third voltage between any two phases of the plurality of phase voltages when the magnitude of a voltage command for the power conversion circuitry 100 is greater than a preset reference value. The control circuitry 300 may further be configured to execute a second mode control of controlling the plurality of switching elements 112, 113, 114, and 115 so as to convert DC power into AC power without producing a combination of the first voltage and the third voltage between any two phases of the plurality of phase voltages even when the magnitude of the voltage command is greater than the reference value. Additionally, the control circuitry 300 may be configured to execute a mode switch of switching between the first mode control and the second mode control is to be performed in response to a user input. In some examples, the control mode of the power conversion circuitry 100 can be selectively switched to one of the first mode control and the second mode control depending on the use or environment.

Another example power conversion device 1A is disclosed herein, being substantially similar to the power conversion device 1, and including an added function of automatically setting (auto tuning) the parameters of the electronic motor 10 (an example of a subject supplied with AC power). The parameters of the electronic motor 10 are used to calculate a control command (for example, the voltage command) for controlling the power conversion circuitry 100.

Figure 9:
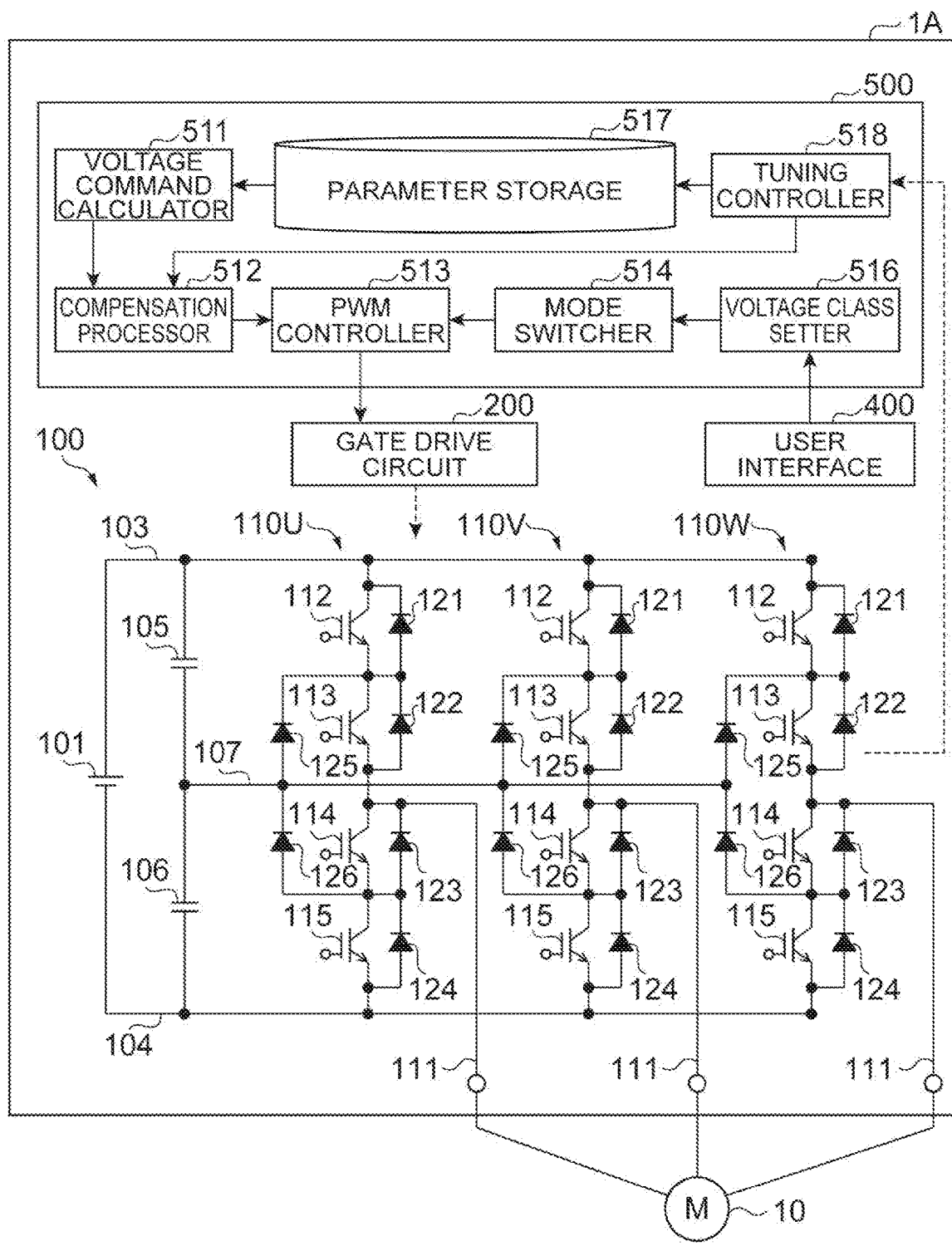
FIG. 9 is a diagram illustrating an example configuration of another power conversion device.

As illustrated in FIG. 9, the power conversion device 1A includes a power conversion circuitry 100, a gate drive circuitry 200, a user interface 400, and a control circuitry 500. The power conversion circuitry 100, the gate drive circuitry 200, and the user interface 400 are the same as those of the power conversion device 1, and thus the description for them will be omitted. It should be noted that, for example, the second voltage (a second potential) is 200

V and the third voltage (a third potential) is 400 V when the first voltage (a first potential) is 0 V.

Like the control circuitry 300, the control circuitry 500 controls a plurality of switching elements 112, 113, 114, and 115 so as to convert DC power into AC power without producing a voltage between negative-side potential (first potential) and positive-side potential (third potential) between any two lines of a plurality of phases (phases of the output line 111 of each phase arm 110U, 110V, 110W). The control circuitry 500 is configured to execute processing including: selecting one of control modes from the first mode control and the second mode control, based on the input by the user; controlling the switching elements 112, 113, 114, and 115 in accordance with a voltage command for tuning in the selected control mode to generate the AC power; calculating, based on the generated AC power, the parameters of a subject supplied with the AC power; calculating a voltage command for controlling based on the calculated parameters; and controlling the switching elements 112, 113, 114, and 115 in accordance with the voltage command for controlling in the selected control mode.

The control circuitry 500 includes, for example, a parameter storage 517, a voltage command calculator 511, a compensation processor 512, a voltage class setter 516, a mode switcher 514, a PWM controller 513, and a tuning controller 518.

The parameter storage 517 stores the parameters of the electronic motor 10. Specific examples of the parameters of the electronic motor 10 include a resistance, an inductance, and a back electromotive force constant.

The voltage command calculator 511 calculates the voltage command (voltage command for controlling) for the power conversion circuitry 100 based on the parameters stored in the parameter storage 517. The voltage command calculator 511 calculates, for example, a voltage command, based on an induced voltage of the electric motor 10 based on a speed command input from the user interface 400, a torque to be produced in the electric motor 10, and a magnetic pole position of the electric motor 10. The voltage command is, for example, a command that defines a voltage to be produced in each of the U phase, the V phase, and the W phase.

The compensation processor 512 performs a variety of compensation processing on the voltage command calculated by the voltage command calculator 511. Specific examples of the compensation processing include compensation for variation in DC bus voltage and deadtime compensation.

The voltage class setter 516 sets the voltage class of the electronic motor 10. The voltage class is a numeric value determining the magnitude of the voltage suitable for driving the electronic motor 10 (for example, the maximum value of the power supply voltage for driving the electronic motor 10 at normal time). For example, the voltage class setter 516 obtains an input for determining the voltage class of the electronic motor 10 from the user interface 400, and sets the voltage class of the electronic motor 10 in accordance with the input.

The mode switcher 514 selects one of the first mode control and the second mode control, based on the input by the user. For example, the mode switcher 514 selects one of the first mode control and the second mode control, based on the voltage class set by the voltage class setter 516. As described above, the voltage class is set based on the input by the user. The setting based on the voltage class is therefore included in the setting based on the input by the user.

The PWM controller 513 controls the switching elements 112, 113, 114, and 115 in accordance with the voltage command described above in the control mode selected by the mode switcher 514. For example, the PWM controller 513 controls the switching elements 112, 113, 114, and 115 so as to convert the DC power of the DC power supply 101 into the AC power in accordance with the voltage command.

The tuning controller 518 controls the switching elements 112, 113, 114, and 115 in accordance with the voltage command for tuning in the control mode selected by the mode switcher 514 to generate the AC power, and calculates, based on the generated AC power (to be supplied to the electronic motor 10), the parameters of the electronic motor 10. For example, the tuning controller 518 outputs the predetermined voltage command to the compensation processor 512. In response to the predetermined voltage command, the compensation processor 512 outputs to the PWM controller 513 the voltage command for tuning that has been subjected to various kinds of compensation processing (hereinafter referred to as the "compensated voltage command"). The PWM controller 513 controls the switching elements 112, 113, 114, and 115 in accordance with the compensated voltage command in the control mode selected by the mode switcher 514. The tuning controller 518 calculates the parameters of the electronic motor 10 based on the information (for example, a detected current value) on the AC power generated by the control in accordance with the compensated voltage command.

The tuning controller 518 overwrites the parameter storage 517 with the calculated parameters of the electronic motor 10. Thereafter, the voltage command calculator 511 calculates the voltage command for controlling based on the parameters calculated by the tuning controller 518.

Power Conversion Procedure

The control procedure executed by the control circuitry 500 will now be described. Like the control procedure executed by the control circuitry 300, this procedure includes determining an on/off switching timing of the plurality of switching elements 112, 113, 114, and 115 so as to convert DC power into AC power without producing a voltage between negative-side potential and positive-side potential between any two lines in the power conversion circuitry 100 and controlling the power conversion circuitry 100 so as to switch the on/off of the plurality of switching elements 112, 113, 114, and 115 at the determined timing. This procedure includes: selecting one of control modes from the first mode control and the second mode control, based on the input by the user; controlling the switching elements 112, 113, 114, and 115 in accordance with the voltage command for tuning in the selected control mode to generate the AC power; calculating, based on the generated AC power, the parameters of a subject supplied with the AC power; calculating a voltage command for controlling based on the calculated parameters; and controlling the switching elements 112, 113, 114, and 115 in accordance with the voltage command for controlling in the selected control mode.

In the following explanation, an example of the control procedure executed by the control circuitry 500 is divided into the setting procedure of the voltage class of the electronic motor 10, the calculating procedure of the parameters of the electronic motor 10, and the control procedure of the power conversion circuitry 100 based on the calculated parameters, and those procedures are explained separately in detail.

(Setting Procedure of Voltage Class)

Figure 10:
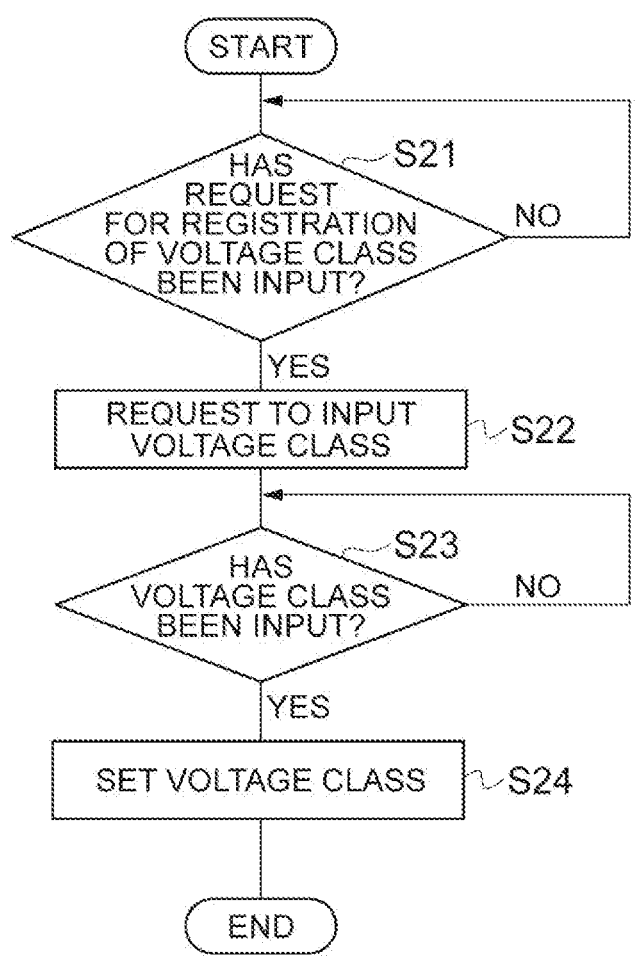
FIG. 10 is a flowchart illustrating an example configuration procedure of voltage class.

As illustrated in FIG. 10, the control circuitry 500 executes steps S21, S22, S23, and S24. In step S21, the voltage class setter 516 waits for the input of request for registration of a voltage class. The request for registration is, for example, input by the user to the user interface 400. In step S22, the voltage class setter 516 requests the user to input a voltage class through the user interface 400. For example, the voltage class setter 516 causes the user interface 400 to display an input screen for a voltage class. In step S23, the voltage class setter 516 waits for the input of the voltage class by the user. For example, the voltage class setter 516 waits for the input of the voltage class to the input screen. In step S24, the voltage class setter 516 sets the value input by the user to the voltage class of the electronic motor 10. For example, the voltage class setter 516 sets the value input to the input screen by the user to the voltage class of the electronic motor 10.

(Calculation Procedure of Parameters)

Figure 11:
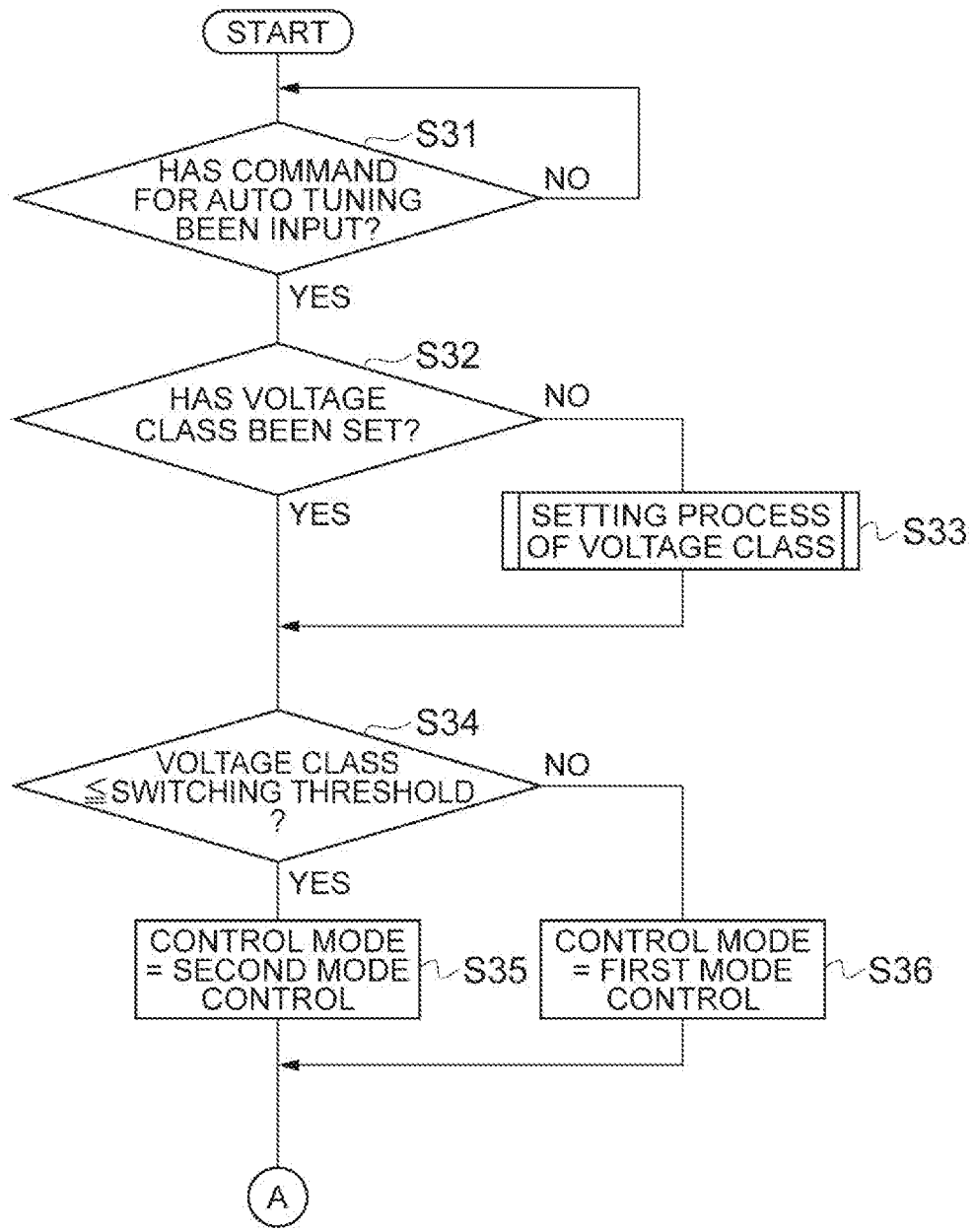
FIG. 11 is a flowchart illustrating an example calculation procedure of parameters.

As illustrated in FIG. 11, the control circuitry 500 executes steps S31, S32, and S33. In step S31, the tuning controller 518 waits for the input of a command for auto tuning. The command is, for example, input by the user to the user interface 400. In step S32, the mode switcher 514 confirms whether the voltage class of the electric motor 10 has been set. If it is determined that the voltage class of the electric motor 10 is not set in step S32, the control circuitry 500 executes step S33. In step S33, the mode switcher 514 causes the voltage class setter 516 to execute a setting process of the voltage class. The voltage class setter 516 executes above-described steps S22, S23, and S24 as the setting process of the voltage class.

If it is determined that the voltage class of the electric motor 10 is set in step S32, the control circuitry 500 does not execute step S33. Next, the control circuitry 500 executes step S34. In step S34, the mode switcher 514 confirms whether the voltage class is smaller than or equal to a predetermined switching threshold. The switching threshold may be equal to the difference between the first potential and the second potential or equal to the difference between the second potential and the third potential.

If it is determined that the voltage class is smaller than or equal to the switching threshold in step S34, the control circuitry 500 executes step S35. In step S35, the mode switcher 514 selects the second mode control as the control mode. If it is determined that the voltage class is determined to exceed the switching threshold in step S34, the control circuitry 500 executes step S36. In step S36, the mode switcher 514 selects the first mode control as the control mode.

Figure 12:
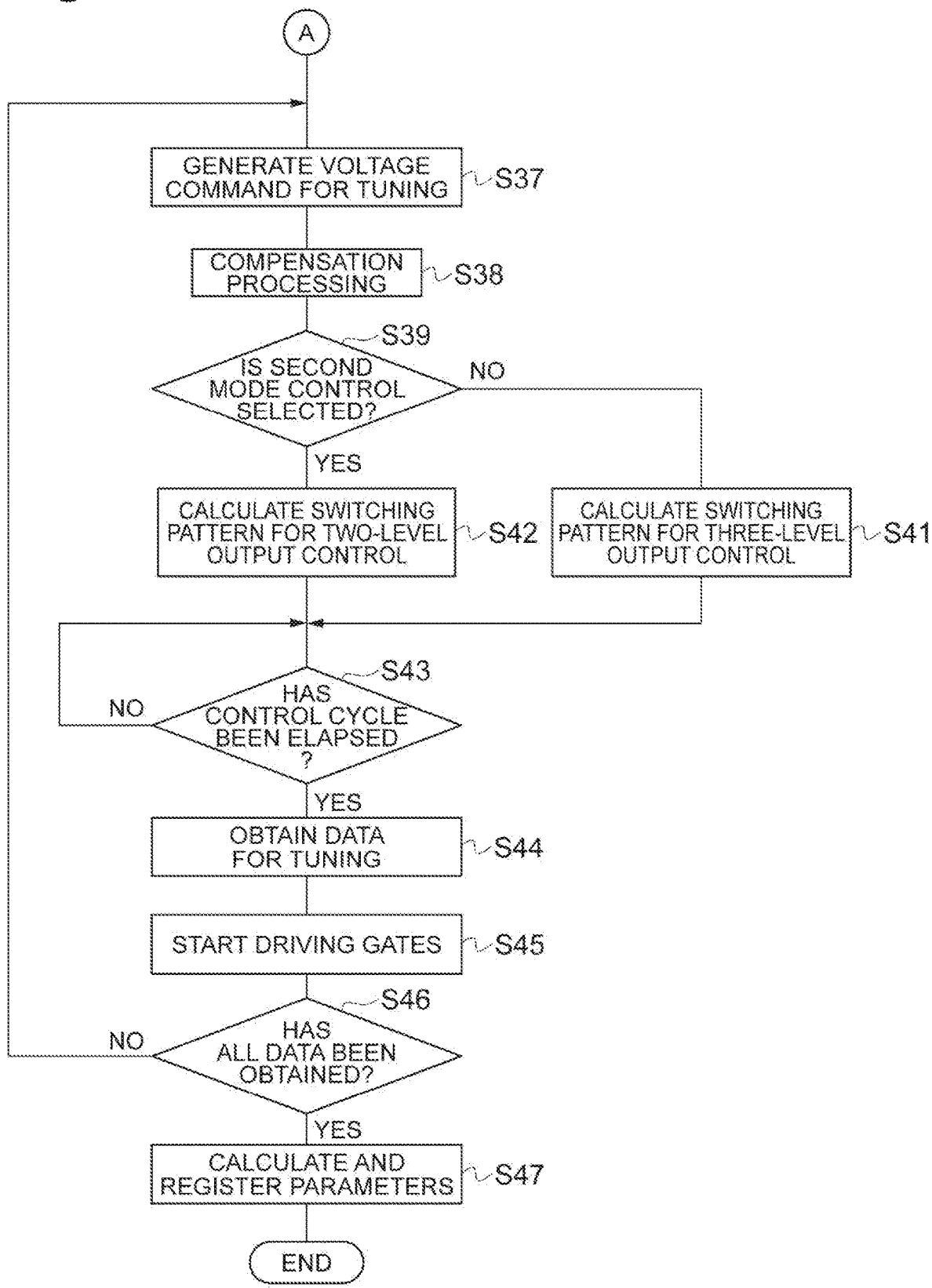
FIG. 12 is a flowchart illustrating an example calculation procedure of parameters.

As illustrated in FIG. 12, then the control circuitry 500 executes steps S37, S38, and S39. In step S37, the tuning controller 518 outputs a predetermined voltage command for tuning to the compensation processor 512. In step S38, the compensation processor 512 executes the compensation processing for the voltage command. In step S39, the PWM controller 513 confirms whether the control mode is the second mode control.

If it is determined that the control mode is not the second control mode in step S39 (in other words, the control mode is the first mode control), the control circuitry 500 executes step S41. In step S41, the PWM controller 513 generates a switching pattern for the three-level output control in accordance with the voltage command.

If it is determined that the control mode is the second control mode in step S39, the control circuitry 500 executes step S42. In step S42, the PWM controller 513 generates a switching pattern for the two-level output control in accordance with the voltage command, irrespective of the magnitude of the voltage command.

After steps S41 and S42, the control circuitry 500 executes steps S43, S44, S45, and S46. In step S43, the PWM controller 513 waits for the elapse of a preset control cycle. In step S44, the PWM controller 513 obtains data (for example, current data) on the AC power supplied from the power conversion circuitry 100 to the electronic motor 10. In step S45, the PWM controller 513 starts the control of the switching elements 112, 113, 114, and 115 in accordance with the switching pattern set in steps S41 and S42. In step S46, the tuning controller 518 confirms whether all data necessary to calculate the parameters have been obtained.

If it is determined that data having not been obtained still remains in step S46, the control circuitry 500 returns the process to step S37 without waiting for the completion of control of the switching elements 112, 113, 114, and 115 in accordance with the switching pattern. Thus, in parallel with the control of the switching elements 112, 113, 114, and 115 in accordance with the switching pattern, a switching pattern for the next control cycle is generated. The control of the switching elements 112, 113, 114, and 115 in accordance with the voltage command for tuning and obtaining of data on AC power are thereafter continued until all data necessary to calculate the parameters are obtained.

If it is determined that all data necessary to calculate the parameters have been obtained in step S46, the control circuitry 500 executes step S47. In step S47, the control circuitry 500 calculates the parameters of the electronic motor 10 based on whole data described above and stores the calculated results in the parameter storage 517. Through the foregoing steps, the calculation procedure of the parameters is completed. In a case that a plurality of kind of parameters are calculated in the auto tuning, the control circuitry 500 may repeat the procedure shown in steps S37 to S47 for the same times as the number of kind of the parameters.

Control Procedure of Power Conversion Circuitry

Figure 13:
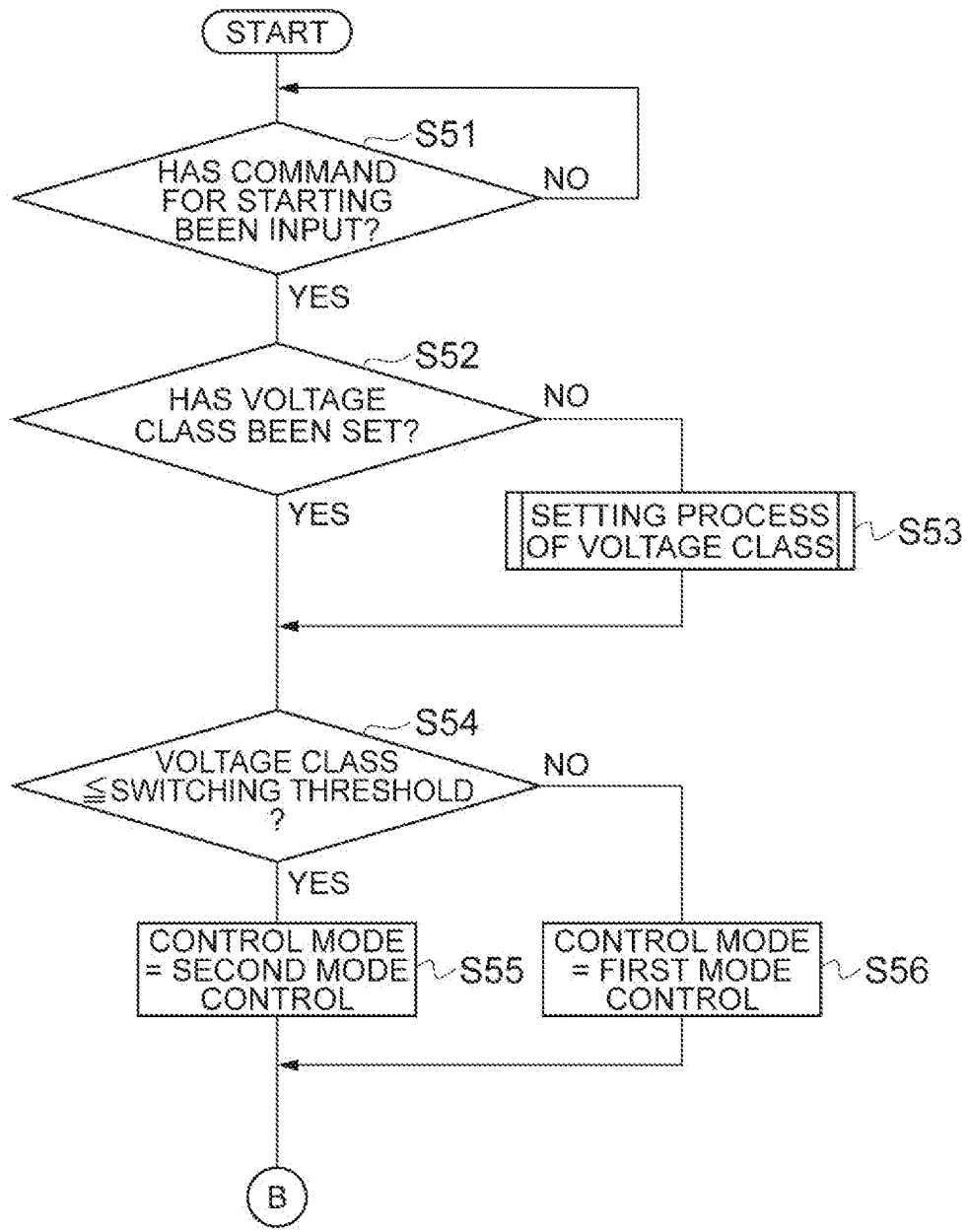
FIG. 13 is a flowchart illustrating an example control procedure of a power conversion circuitry.

As illustrated in FIG. 13, the control circuitry 500 executes steps S51, S52, and S53. In step S51, the voltage command calculator 511 waits for a command for starting the electronic motor 10. The command is, for example, input by the user to the user interface 400. In step S52, the mode switcher 514 confirms whether the voltage class of the electric motor 10 has been set. If it is determined that the voltage class of the electric motor 10 is not set in step S52, the control circuitry 500 executes step S53. In step S53, the mode switcher 514 causes the voltage class setter 516 to execute a setting process of the voltage class. The voltage class setter 516 executes above-described steps S22, S23, and S24 as the setting process of the voltage class.

If it is determined that the voltage class of the electric motor 10 is set in step S52, the control circuitry 500 does not execute step S53. Next, the control circuitry 500 executes S54. In step S54, the mode switcher 514 confirms whether the voltage class is smaller than or equal to the switching threshold.

If it is determined that the voltage class is smaller than or equal to the switching threshold in step S54, the control circuitry 500 executes step S55. In step S55, the mode switcher 514 selects the second mode control as the control mode. If it is determined that the voltage class is determined to exceed the switching threshold in step S54, the control circuitry 500 executes step S56. In step S56, the mode switcher 514 selects the first mode control as the control mode.

Figure 14:
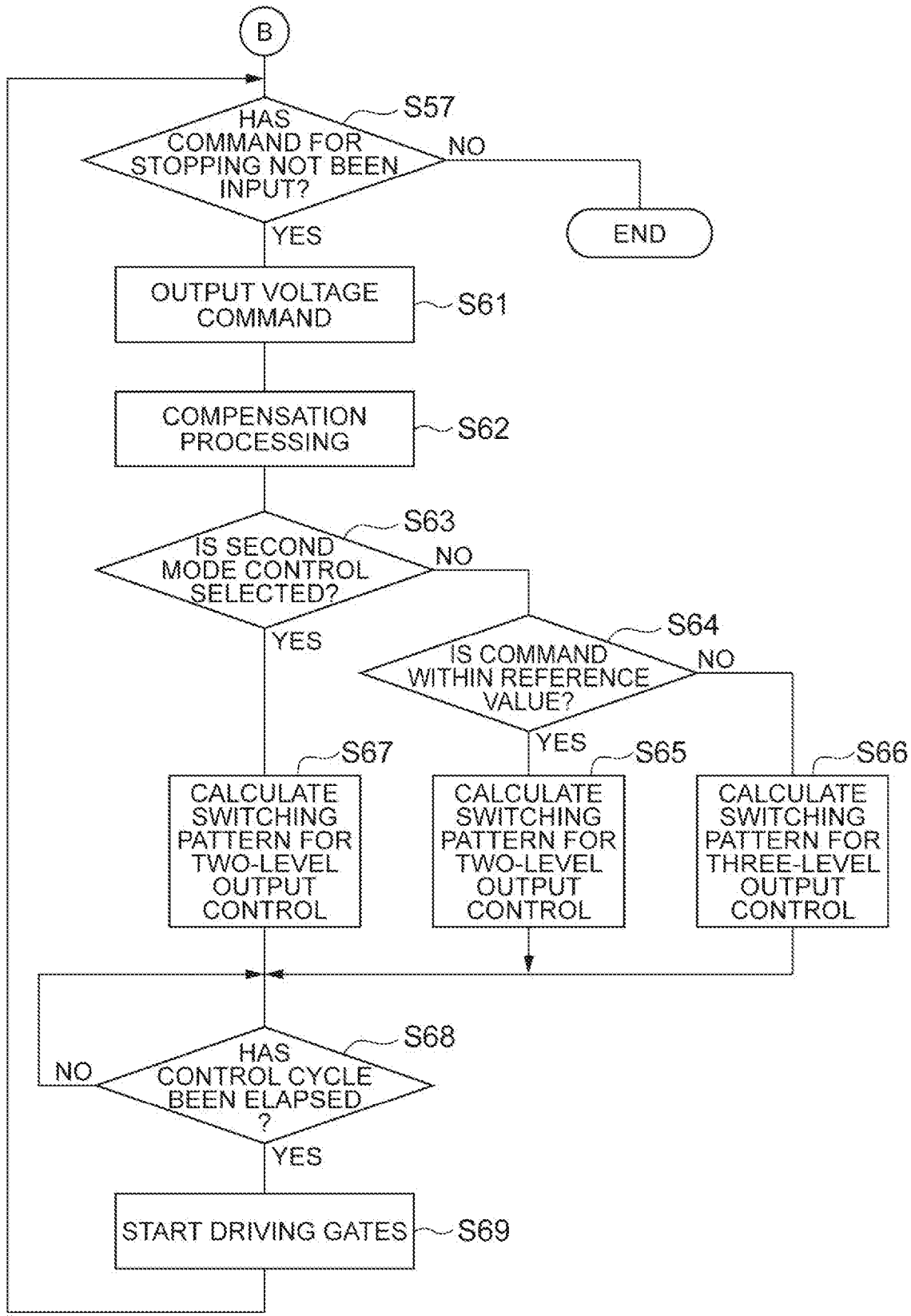
FIG. 14 is a flowchart illustrating an example control procedure of a power conversion circuitry.

As illustrated in FIG. 14, then the control circuitry 500 executes step S57. In step S57, the voltage command calculator 511 confirms whether a command for stopping the electronic motor 10 has been input. The command is, for example, input by the user to the user interface 400.

If it is determined that the command for stopping is not detected in step S57, the control circuitry 500 executes steps S61, S62, and S63. In step S61, the voltage command calculator 511 outputs the voltage command for controlling to the compensation processor 512 based on the parameters stored in the parameter storage 517. The voltage command calculator 511 calculates, for example, a voltage command, based on a speed command input from the user interface 400, a torque and magnetic flux to be produced in the electric motor 10, and a magnetic pole position and a speed of the electric motor 10, and outputs the calculation result to the compensation processor 512. In step S62, the compensation processor 512 executes the compensation processing for the voltage command. In step S63, the PWM controller 513 confirms whether the control mode is the second mode control.

If it is determined that the control mode is not the second control mode in step S63 (in other words, the control mode is the first mode control), the control circuitry 500 executes step S64. In step S64, the PWM controller 513 confirms whether the magnitude of the voltage command is within the reference value.

If it is determined that the magnitude of the voltage command is within the reference value in step S64, the control circuitry 500 executes step S65. In step S65, the PWM controller 513 generates switching patterns of the switching elements 112, 113, 114, and 115 for the two-level output control in accordance with the voltage command.

If it is determined that the magnitude of the voltage command is not within the reference value in step S64, the control circuitry 500 executes step S66. In step S66, the PWM controller 513 generates a switching pattern for the three-level output control in accordance with the voltage command.

If it is determined that the control mode is the second mode control in step S63, the control circuitry 500 executes step S67. In step S67, the PWM controller 513 generates a switching pattern for the two-level output control in accordance with the voltage command, irrespective of the magnitude of the voltage command.

After steps S65, S66, and S67, the control circuitry 500 executes steps S68 and S69. In step S68, the PWM controller 513 waits for the elapse of a preset control cycle. In step S69, the PWM controller 513 starts the control of the switching elements 112, 113, 114, and 115 in accordance with the switching pattern set in steps S65, S66, and S67. Upon starting this control, the control circuitry 500 returns the process to step S61 without waiting for completion of control of the switching elements 112, 113, 114, and 115 in accordance with the switching pattern. Thus, in parallel with the control of the switching elements 112, 113, 114, and 115 in accordance with the switching pattern, a switching pattern for the next control cycle is generated. The control of the power conversion circuitry 100 in the selected control mode is thereafter continued until the command for stopping is input. If it is determined that the command for stopping is input in step S57, the control circuitry 500 completes the control of the power conversion circuitry 100.

As described above, the control circuitry 500 is configured to execute processing including: selecting one of control modes from the first mode control and the second mode control based on the input by the user; controlling the switching elements 112, 113, 114, and 115 in accordance with the voltage command for tuning in the selected control mode to generate the AC power; calculating, based on the generated AC power, the parameters of a subject supplied with the AC power; calculating a voltage command for controlling based on the calculated parameters; and controlling the switching elements 112, 113, 114, and 115 in accordance with the voltage command for controlling in the selected control mode. When the parameters of the subject (load) supplied with the AC power are set, it is therefore able to match a voltage on the power supply side with a voltage supplied to the load. This configuration can therefore simplify the configuration for matching a voltage on the power supply side with a voltage supplied to a load, and can set parameters of a load with a high reliability.

It is to be understood that not all aspects, advantages and features described herein may necessarily be achieved by, or included in, any one particular example embodiment. Indeed, having described and illustrated various examples herein, it should be apparent that other examples may be modified in arrangement and detail.

We claim all modifications and variations coming within the spirit and scope of the subject matter claimed herein.

What is claimed is:

1. A power conversion device comprising:
power conversion circuitry configured to switch on/off a plurality of switching elements during a power conversion process for driving a motor in order to switch each of a plurality of phase voltages to one or more voltages selected from the group consisting of a first voltage, a second voltage higher than the first voltage, and a third voltage higher than the second voltage, wherein a concurrent combination of the second voltage with either of the first voltage or the third voltage results in a low voltage control during the power conversion process, and wherein a concurrent combination of the first voltage with the third voltage results in a high voltage control during the power conversion process; and
control circuitry configured to:
identify a power conversion setting associated with a maximum voltage rating of the motor in order to selectively control the power conversion circuitry so as to convert direct current power into alternating current power based on the maximum voltage rating of the motor;
select a first control mode of the power conversion process when the power conversion setting indicates that the maximum voltage rating of the motor is greater than a predetermined threshold value, wherein during the first control mode of the power conversion process the power conversion circuitry is allowed to perform the high voltage control depending on a voltage command of the power conversion circuitry; and
select a second control mode of the power conversion process when the power conversion setting indicates that the maximum voltage rating of the motor is less than the predetermined threshold value, wherein during the second control mode of the power conversion process the power conversion circuitry is prohibited from performing the high voltage control regardless of the voltage command.

2. The power conversion device according to claim 1, wherein the control circuitry is configured to control the power conversion circuitry so as to place the switching elements in a first state of the power conversion process in which the selected voltages do not include the third voltage, and to place the switching elements in a second state of the power conversion process in which the selected voltages do not include the first voltage during the second control mode.

3. The power conversion device according to claim 2, wherein the control circuitry is configured to control the power conversion circuitry to switch one or more of the switching elements so as to bring all of the phase voltages to the second voltage during a transitional state between the first state and the second state during the second control mode.

4. The power conversion device according to claim 2, wherein the control circuitry is configured to control the power conversion circuitry to place the switching elements in a first instance of the first state and a second instance of the first state sequentially, and to switch one or more of the switching elements to bring all of the phase voltages to the first voltage during a transitional state between the first instance of the first state and the second instance of the first state during the second control mode.

5. The power conversion device according to claim 2, wherein the control circuitry is configured to control the power conversion circuitry to place the switching elements in a first instance of the second state and a second instance of the second state sequentially, and to switch one or more of the switching elements to bring all of the phase voltages to the third voltage during a transitional state between the first instance of the second state and the second instance of the second state during the second control mode.

6. The power conversion device according to claim 2, wherein the control circuitry is configured to control the power conversion circuitry to place the switching elements in a first instance of the first state and a second instance of the first state, and to place the switching elements in a first instance of the second state and a second instance of the second state, so as to repeat the first state and the second state during the second control mode.

7. The power conversion device according to claim 6, wherein the control circuitry is configured to control the power conversion circuitry to place the switching elements in the second instance of the first state prior to placing the switching elements in the second state.

8. The power conversion device according to claim 1, wherein the control circuitry is configured to select each of the voltages by controlling the power conversion circuitry to selectively switch a different pair of the switching elements.

9. The power conversion device according to claim 1, wherein the control circuitry is further configured to:
perform the high voltage control during the first control mode when a magnitude of a voltage command for the power conversion circuitry is greater than a preset reference value; and
perform the low voltage control during the second control mode even when the magnitude of the voltage command is greater than the preset reference value.

10. The power conversion device according to claim 1, wherein the control circuitry is further configured to:
control the power conversion circuitry in accordance with a first voltage command in the selected control mode to generate a first alternating current power;
calculate, based on the first alternating current power, parameters of a subject supplied with the first alternating current power;
calculate a second voltage command based on the calculated parameters; and
control the power conversion circuitry in accordance with the second voltage command in the selected control mode.

11. A control method for a power conversion circuitry configured to switch on/off a plurality of switching elements during a power conversion process for driving a motor in order to switch each of a plurality of phase voltages to one or more voltages selected from the group consisting of a first voltage, a second voltage higher than the first voltage, and a third voltage higher than the second voltage, the control method comprising:
identifying a power conversion setting associated with a maximum voltage rating of the motor in order to selectively control the power conversion circuitry so as to convert the direct current power into the alternating current power based on the maximum voltage rating of the motor, wherein a concurrent combination of the second voltage with either of the first voltage or the third voltage results in a low voltage control during the power conversion process, and wherein a concurrent combination of the first voltage and the third voltage results in a high voltage control during the power conversion process;
selecting a first control mode of the power conversion process when the power conversion setting indicates that the maximum voltage rating of the motor is greater than a predetermined threshold value, wherein during the first control mode of the power conversion process the power conversion circuitry is allowed to perform the high voltage control depending on a voltage command of the power conversion circuitry; and
selecting a second control mode of the power conversion process when the power conversion setting indicates that the maximum voltage rating of the motor is less than the predetermined threshold value, wherein during the second control mode of the power conversion process the power conversion circuitry is prohibited from performing the high voltage control regardless of the voltage command.

12. The control method according to claim 11, further comprising controlling the power conversion circuitry so as to place the switching elements in a first state in which the selected voltages do not include the third voltage, and to place the switching elements in a second state in which the selected voltages do not include the first voltage during the second control mode.

13. The control method according to claim 12, further comprising controlling the power conversion circuitry to switch one or more of the switching elements so as to bring all of the phase voltages to the second voltage during a transitional state between the first state and the second state during the second control mode.

14. The control method according to claim 12, further comprising controlling the power conversion circuitry to place the switching elements in a first instance of the first state and a second instance of the first state sequentially, and to switch one or more of the switching elements to bring all of the phase voltages to the first voltage during a transitional state between the first instance of the first state and the second instance of the first state during the second control mode.

15. The control method according to claim 12, further comprising controlling the power conversion circuitry to place the switching elements in a first instance of the second state and a second instance of the second state sequentially, and to switch one or more of the switching elements to bring all of the phase voltages to the third voltage during a transitional state of the power conversion process between the first instance of the second state and the second instance of the second state during the second control mode.

16. The control method according to claim 12, further comprising controlling the power conversion circuitry to place the switching elements in a first instance of the first state and a second instance of the first state, and to place the switching elements in a first instance of the second state and a second instance of the second state, so as to repeat the first state and the second state during the second control mode.

17. The control method according to claim 11, further comprising:
performing the high voltage control during the first control mode when a magnitude of a voltage command for the power conversion circuitry is greater than a preset reference value; and
performing the low voltage control during the second control mode even when the magnitude of the voltage command is greater than the preset reference value.

18. The control method according to claim 11, further comprising:
controlling the power conversion circuitry in accordance with a first voltage command in the selected control mode to generate a first alternating current power;
calculating, based on the first alternating current power, parameters of a subject supplied with the first alternating current power;
calculating a second voltage command for controlling based on the calculated parameters; and
controlling the power conversion circuitry in accordance with the second voltage command for controlling in the selected control mode.

19. A non-transitory memory device having instructions stored thereon that, in response to execution by a processing device, cause the processing device to perform operations of controlling power conversion circuitry configured to switch on/off a plurality of switching elements during a power conversion process for driving a motor in order to switch each of a plurality of phase voltages to one or more voltages selected from the group consisting of a first voltage, a second voltage higher than the first voltage, and a third voltage higher than the second voltage, the operations comprising:
identifying a power conversion setting associated with a maximum voltage rating of the motor in order to selectively control the power conversion circuitry so as to convert direct current power into alternating current power based on the maximum voltage rating of the motor;
selecting a first control mode of the power conversion process when the power conversion setting indicates that the maximum voltage rating of the motor is greater than a predetermined threshold value, wherein during the first control mode of the power conversion process the power conversion circuitry is allowed to perform the high voltage control depending on a voltage command of the power conversion circuitry; and
selecting a second control mode of the power conversion process when the power conversion setting indicates that the maximum voltage rating of the motor is less than the predetermined threshold value, wherein during the second control mode of the power conversion process the power conversion circuitry is prohibited from performing the high voltage control regardless of the voltage command.

20. The non-transitory memory device according to claim 19, wherein the operations further comprise:
performing the high voltage control during the first control mode when a magnitude of a voltage command for the power conversion circuitry is greater than a preset reference value; and
performing the low voltage control during the second control mode even when the magnitude of the voltage command is greater than the preset reference value.

* * * * *